US008122345B2

(12) United States Patent
Chen et al.

(10) Patent No.: US 8,122,345 B2
(45) Date of Patent: Feb. 21, 2012

(54) FUNCTION-BASED OBJECT MODEL FOR USE IN WEBSITE ADAPTATION

(75) Inventors: Jin-Lin Chen, Beijing (CN); Yudong Yang, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 616 days.

(21) Appl. No.: 12/264,566

(22) Filed: Nov. 4, 2008

(65) Prior Publication Data

US 2009/0100330 A1    Apr. 16, 2009

Related U.S. Application Data

(63) Continuation of application No. 09/893,335, filed on Jun. 26, 2001, now Pat. No. 7,458,017.

(51) Int. Cl.
*G06F 17/00* (2006.01)

(52) U.S. Cl. .................................................. 715/249

(58) Field of Classification Search .................. 715/234, 715/249, 273
See application file for complete search history.

(56) References Cited

U.S. PATENT DOCUMENTS

| | | | |
|---|---|---|---|
| 5,537,526 A | 7/1996 | Anderson et al. | |
| 5,704,029 A | 12/1997 | Wright | |
| 5,893,127 A | 4/1999 | Tyan et al. | |
| 5,918,237 A * | 6/1999 | Montalbano | 715/206 |
| 6,023,714 A | 2/2000 | Hill et al. | |
| 6,167,409 A | 12/2000 | DeRose et al. | |
| 6,230,174 B1 | 5/2001 | Berger et al. | |
| 6,300,947 B1 | 10/2001 | Kanevsky | |
| 6,345,279 B1 | 2/2002 | Li et al. | |
| 6,493,703 B1 * | 12/2002 | Knight et al. | 1/1 |
| 6,542,925 B2 | 4/2003 | Brown et al. | |
| 6,546,406 B1 | 4/2003 | DeRose et al. | |
| 6,556,217 B1 * | 4/2003 | Makipaa et al. | 345/667 |
| 6,564,263 B1 | 5/2003 | Bergman et al. | |
| 6,573,907 B1 | 6/2003 | Madrane | |
| 6,680,976 B1 | 1/2004 | Chen et al. | |
| 6,785,676 B2 | 8/2004 | Oblinger | |
| 6,876,625 B1 | 4/2005 | McAllister et al. | |
| 6,876,628 B2 | 4/2005 | Howard et al. | |
| 6,898,800 B2 | 5/2005 | Son et al. | |
| 6,910,049 B2 * | 6/2005 | Fenton et al. | 1/1 |

(Continued)

OTHER PUBLICATIONS

Manola, Frank, "Towards a Web Object Model", Object Services and Consulting, Inc (OBJS), downloaded from http://www.objs.com/OSA/wom.htm, archived to Jun. 14, 1998, pp. A, 1-59.*

(Continued)

*Primary Examiner* — Laurie Ries
(74) *Attorney, Agent, or Firm* — Lee & Hayes, PLLC

(57) ABSTRACT

By understanding a website author's intention through an analysis of the function of a website, website content can be adapted for presentation or rendering in a manner that more closely appreciates and respects the function behind the website. Various inventive systems and methods analyze a website's function so that its content can be adapted to different client environments, e.g. devices, network conditions, or user preferences. A novel function-based object model automatically identifies objects associated with a website, and analyzes those objects in terms of their functions. The function-based object model permits consistent, informed decisions to be made in the adaptation process, so that web content is displayed not only in an organized manner, but in a manner that reflects the author's intention.

30 Claims, 15 Drawing Sheets

U.S. PATENT DOCUMENTS

| | | | |
|---|---|---|---|
| 7,051,276 | B1 | 5/2006 | Mogilevsky et al. |
| 7,093,001 | B2 | 8/2006 | Yang et al. |
| 7,093,011 | B2 | 8/2006 | Hirata et al. |
| 7,178,097 | B1* | 2/2007 | Talluri .................. 715/205 |
| 7,225,397 | B2 | 5/2007 | Fukuda et al. |
| 7,246,306 | B2 | 7/2007 | Chen et al. |
| 7,278,098 | B1 | 10/2007 | Boye et al. |
| 7,599,983 | B2 | 10/2009 | Harper et al. |
| 2001/0054049 | A1 | 12/2001 | Maeda et al. |
| 2002/0016801 | A1 | 2/2002 | Reiley et al. |
| 2002/0099829 | A1 | 7/2002 | Richards et al. |
| 2002/0143821 | A1 | 10/2002 | Jakubowski |
| 2002/0156807 | A1 | 10/2002 | Dieberger |
| 2002/0169854 | A1* | 11/2002 | Tarnoff .................. 709/219 |
| 2003/0005159 | A1 | 1/2003 | Kumhyr |
| 2003/0014442 | A1 | 1/2003 | Shiigi et al. |
| 2003/0037076 | A1 | 2/2003 | Bravery et al. |
| 2003/0095135 | A1 | 5/2003 | Kaasila et al. |
| 2003/0101203 | A1 | 5/2003 | Chen et al. |
| 2003/0115365 | A1 | 6/2003 | Lindsey |
| 2003/0217117 | A1 | 11/2003 | Dan et al. |
| 2004/0085341 | A1 | 5/2004 | Hua et al. |
| 2004/0086046 | A1 | 5/2004 | Ma et al. |
| 2004/0088726 | A1 | 5/2004 | Ma et al. |
| 2004/0172484 | A1 | 9/2004 | Hafsteinsson et al. |
| 2004/0187080 | A1 | 9/2004 | Brooke et al. |
| 2005/0108637 | A1* | 5/2005 | Sahota et al. ............... 715/526 |
| 2005/0114434 | A1 | 5/2005 | Yang et al. |
| 2006/0129671 | A1 | 6/2006 | Yang et al. |
| 2007/0089053 | A1 | 4/2007 | Uhlig et al. |
| 2007/0156677 | A1 | 7/2007 | Szabo |

OTHER PUBLICATIONS

"Abstraction", Jan. 30, 2007, at <<http://www.webopedia.com/TERM/a/abstraction.html>>, Jupitermedia Corporation, 2007, pp. 1-2.

Breslauer, et al., "A Lower Bound for Parallel String Matching", Annual ACM Symposium on Theory of Computing, 1991, pp. 439-443.

Cai et al, "Extracting Content Structure for Web Pages based on Visual Representation", ACM Transactions on Info. Sys., vol. 20, No. 1, Jan. 2002.

Chen, et al., "Function-Based Object Model Towards Website Adaptation," World Wide Web, 2001, pp. 587-596.

Christopoulos, Charilaos; et al., "The JPEG2000 Still Image Coding System: An Overview," IEEE Transactions on Consumer Electronics, vol. 46, No. 4, pp. 1103-1127, Nov. 2000.

Itti and Koch, "A Comparison of Feature Combination Strategies for Saliency-Based Visual Attention Systems", Proc. of SPIE HumanVision and Electronic Imaging IV (HVEI 99), San Jose, CA, vol. 3644, pp. 473-482, Jan. 1999.

Itti et al., "A Model of Saliency-based Visual Attention for Rapid Scene Analysis", IEEE Trans. on Pattern Analysis and Machine Intelligence, 1998, 5 pages.

Itti & Koch, "Computational Modelling of Visual Attention," Nature Reviews/Neuroscience, Bol. 2, Mar. 2001, pp. 1-11.

Karkkainen, et al., "Two and Higher Dimensional Pattern Matching in Optimal Expected Time", SODA '94: Proceedings of the fifth annual ACM-SIAM symposium on Discrete algorithms, 1994, pp. 715-723.

Lee, Keansub et al., "Perception-Based Image Transcoding for Universal Multimedia Access," School of Electrical Engineering Korea University, Seoul, Korea, 2001 IEEE, pp. 475-478.

Lin et al., "Video Scene Extraction by Force Competition," IEEE Intl. Conference on Multimedia and Expo (ICME 001), Waseda University, Tokyo, Japan, Aug. 22-25, 2001, 7 pages.

Ma et al., "A framework for adaptive content delivery in heterogeneous network environments", Jan. 2000, SPIE vol. 3969, Proceedings of MMCN00, San Jose, USA, 15 pages.

Manola, "Towards a Web Object Model", at <<http://www.objs.com/OSA/wom.htm>>, Feb. 10, 1998, pp. 1-60.

Navarro, "A Guided Tour to Approximate String Matching", ACM Computing Surveys, vol. 33, No. 1, Mar. 2001, pp. 31-88.

O'Toole et al., "Evaluation of Automatic Shot Boundary Detection on a Large Video Test Suite," School of Computer Applications and School of Electronic Engineering, Dublin City University, Glasnevin, Dublin, Ireland, Challenge of Image Retrieval, Newcastle, 1999, pp. 1-12.

Refreshable Braille Displays, Mar. 11, 2000, retrieved from the Internet Oct. 26, 2005:http://web.archive.org/web/200000311151437/http://www.deafblind.com/display.html], pp. 1-2.

"Schema Objects", Chapter 10, Oracle 8i Concepts, Release 8.15, 1999, 48 pages.

Smith, et al., "Scalable Multimedia Delivery for Pervasive Computing", ACM, Multimedia 99, 1999, pp. 131-140.

Smith and Kanade, "Video Skimming and Characterization through the Combination of Image and Language Understanding Techniques," Proce. of Computer Vision and Pattern Recognition, 1997 IEEE, pp. 775-781.

Visually Impaired, Aug. 22, 2002, retrieved from the Internet Oct. 26, 2005:[http://web.archive.org/web/20020822193408/http://linusdocs.org/HOWTOs/Access-HOWTO-3.html], pp. 1-6.

Zhang, "Adaptive Content Delivery: A New Application Area For Media Computing Research", Jan. 2000, Available at http://research.microsoft.com/china/papers/Adaptive_Content_Delivery.pdf, 8 pages.

Abdelzaher, et al., "Web Server QoS Management by Adaptive Content Delivery", Hewlett Packard, Dec. 1999, pp. 1-11.

Mohapatra, et al., "A Framework for Managing QoS and Improving Performance of Dynamic Web Content", GlobeComm (Global Telecommunication Conference), IEEE, Nov. 2001, pp. 1-5.

Bickmore, et al., "Digestor: device-independent access to the World Wide Web", 1997, Computer Networks and ISDB Systems 29, pp. #1-pp. #8.

Chen et al., "Detecting Web Page Structure for Adaptive Viewing on Small Form Factor Devices", WWW' 2003, May 20-24, 2003, Budapest, Hungary, ACM, pp. #1-pp. #9.

Non-Final Office Action for U.S. Appl. No. 12/262,105, mailed on Jun. 29, 2011, Jin-Lin CHen, "Function-based Object Model for Web Page Display in a Mobile Device".

* cited by examiner

FUNCTION-BASED OBJECT MODEL FOR USE IN WEBSITE ADAPTATION

RELATED APPLICATIONS

This is a continuation application which claims priority to commonly assigned co-pending U.S. patent application Ser. No. 09/893,335, entitled "Function-based Object Model for Use in WebSite Adaptation" to Chen et al., filed on Jun. 26, 2001, which is incorporated by reference herein for all that it teaches and discloses.

TECHNICAL FIELD

This invention relates to methods and systems for adapting websites for presentation or rendering on different devices.

BACKGROUND

The increasing diversity in terms of devices, protocols, networks and user preferences in today's web has made adaptive capability critical for Internet applications. The term "adaptive capability" means having the ability to take web content presented in one form (such as that which would be presented in the form of a website on a desktop computer) and process it to present or display it in another form (such as that which would be presented on a handheld device).

To achieve adequate adaptation, it can become crucial to understand a website's structure and content function, as intended by the author of that website. Most of the previous works in this particular area achieve adaptation only under some special conditions due to the lack of structural information. Some works have attempted to extract semantic structural information from HTML tags either manually or automatically. These approaches, however, lack an overview of the whole website. In addition, these approaches are only suitable for HTML content. Furthermore, most of the approaches do not work effectively even for HTML pages because HTML was designed for both presentational and structural representation of content. Further misuses of structural HTML tags for layout purpose make the situation even worse. Cascade Style Sheets (as set forth in the W3C) attempts to compensate for this situation by representing the presentation information separately, but its application is quite limited. Moreover, the difficulty of extracting semantic structure from HTML tags is still not solved by Cascade Style Sheets. Accordingly, the results of previous semantic rule-based approaches for HTML content are not very stable for general web pages.

Smith et al., in *Scalable Multimedia Delivery for Pervasive Computing, Proc.*, ACM Multimedia 99, 1999, pp. 131-140, proposed a so-called InfoPyramid model to represent the structural information of multimedia content. However, the InfoPyramid model does not exist in current web content. XML provides a semantic structural description of content by Document Type Description (DTD). However, a DTD is not a general solution because each application area would necessarily require its own special DTD. Additionally, XML does not take into consideration the function of content. Additionally, although Extensible Stylesheet Language (as set forth in the W3C) provides a flexible way of presenting the same content in different devices, it needs be generated manually, which would be a labor-intensive work for authors.

Accordingly, this invention arose out of concerns associated with providing improved methods and systems for website adaptation.

SUMMARY

In accordance with the described embodiments, a function-based object model (FOM) for website adaptation is described. The function-based object model attempts to understand an author's intention that underlies an authored website. It does so by identifying and using object functions and categories. In accordance with FOM techniques, a website is analyzed to identify objects that are associated with that website. The objects are then classified as basic objects (BO) and composite objects (CO). Each object comprising part of a website serves certain functions. These functions are defined as either basic functions or specific functions. The functions reflect an author's intention regarding the purpose of a particular object.

Based on this observation, the FOM model includes two complementary aspects: a so-called Basic FOM and a Specific FOM. The basic FOM represents an object by its basic functional properties, and the specific FOM represents an object by its category. Combining the Basic FOM and the Specific FOM together, a thorough understanding of an author's intention regarding a website can be ascertained. The described embodiments can provide an automatic approach for detecting the functional properties and category of an object for FOM generation.

FOM provides two level guidelines for web content adaptation: general rule-based on Basic FOM, and specific rules based on Specific FOM. Through the rule-based approach, a website can thus be automatically adapted in a manner that preserves, to a desirable degree, the author's original intention with respect to the website.

DETAILED DESCRIPTION

Overview

By understanding a website author's intention through an analysis of the function of a website, website content can be adapted for presentation or rendering. In the context of this document, the terms "presentation" and "rendering", as such pertains to the display of content such as a webpage, are used interchangeably. Adaptation can take place in view of different client environments (devices, networking conditions such as modem and LAN, and user preferences such as browsing for long term and short term goals) to name just a few. Adaptation can thus be effected in a manner that more closely appreciates and respects the function behind the website. Various systems and methods are described below that analyze a website's function so that its content can be adapted to various devices. A novel function-based object model automatically identifies objects associated with a website and analyzes those objects in terms of their functions. The function-based object model permits consistent, informed decisions to be made in the adaptation process so that web content is displayed not only in an organized manner, but in a manner that reflects the author's intention.

Function-Based Object Model

In the described embodiments, an "object" is the basic element of a hypermedia system and comprises a piece or a set of information that performs certain functions. According to the number of component objects an object contains, objects can be classified as basic objects and composite objects. In the discussion that follows, two function-based object models are described—(1) the basic function-based object model and (2) the specific function-based object model. The basic function-based object model is described in the context of both basic objects and composite objects. The specific function-based object model is discussed in the context of providing object categories that directly reflect a website author's intention. Such will become more apparent as the description below is read.

Basic Function-Based Object Model of a Basic Object

In a hypermedia system, a "basic object" is the smallest information body that cannot be further divided. Only as a whole can it perform certain functions. In the HTML context, a basic object is defined by a set of HTML tags that enclose no additional HTML tags. A basic object can perform or be associated with one or more of the following basic functions. It can provide some semantic information to users (i.e. provide some user-understandable meaning), guide users to other objects via a hyperlink, beautify or otherwise provide some type of visually perceptible and/or pleasing effect on a page, or have an associated interface for users to interact or otherwise communicate with the system.

Figure 1:
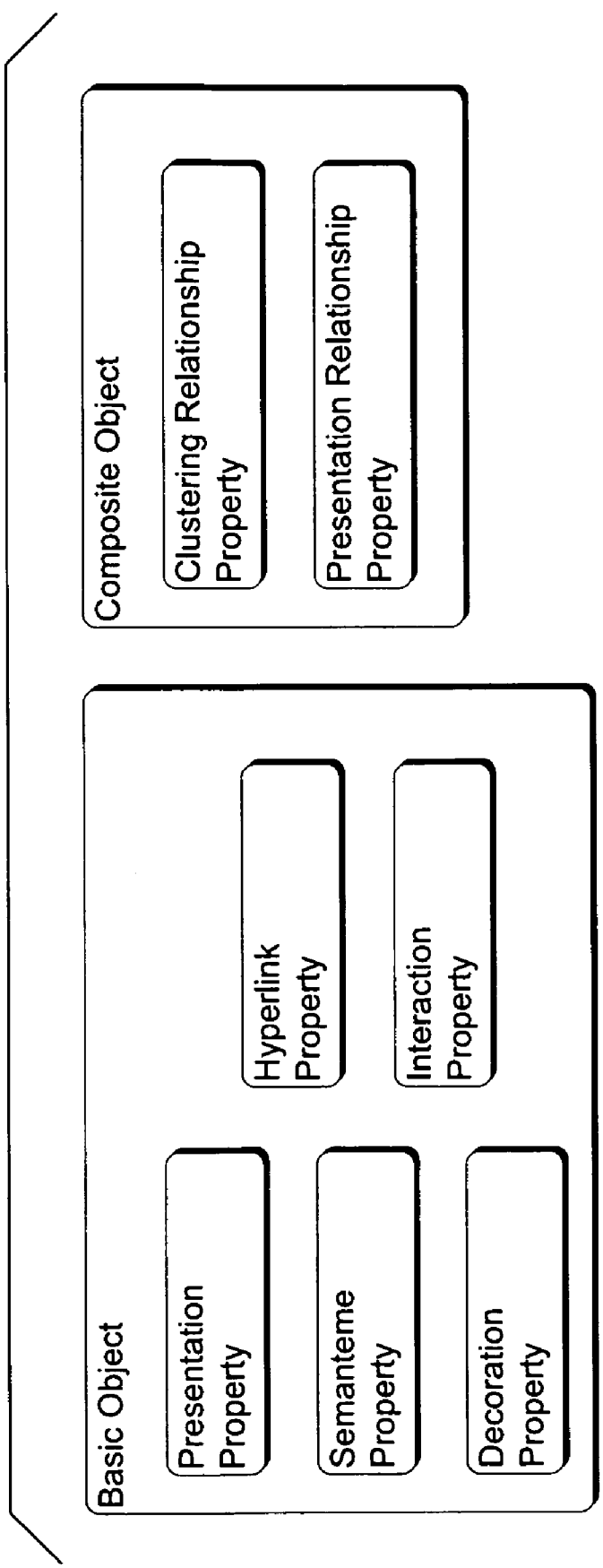
FIG. 1 is a block diagram that illustrates two exemplary objects in accordance with the described embodiments.

In accordance with the above-mentioned functions of the basic object, a basic object can be considered as having the following properties, which are also set forth in FIG. 1.

Presentation: defines the way that a basic object shows itself to or is otherwise presented to users. Presentation properties can include Media Type, Layout Format and Encoding Format, each of which can be assigned values as will become apparent below.

Semanteme: the content meaning of a basic object. Since XML has a good scheme for describing the semantic meaning of contents, here semanteme is more at semantic layer such as Keyword, Headline, Abstract and Content instead.

Decoration: pertains to the extent to which a basic object serves to beautify or decorate the webpage. A decoration value can be assigned to a basic object and is indicated as x, x∈[0,1]. The higher the value of x, the more an object serves for decoration. If x=1, the basic object serves only a decoration function, without any other information. If x=0, the basic object has no decoration function.

Hyperlink: pertains to the object a basic object points to, and which has the following cases: (1) No Hyperlink, (2) Hyperlink to Other Object and (3) Hyperlink to Other Application.

Interaction: pertains to the interaction method of a basic object, and which has the following cases: Display (for presenting information), Button (for selecting list item or submitting information) and Input (for inputting information).

Accordingly, based on the properties described above, the function-based object model of a basic object can be represented as follows:

Basic Object (Presentation, Semanteme, Decoration, Hyperlink, Interaction)

Figure 2:
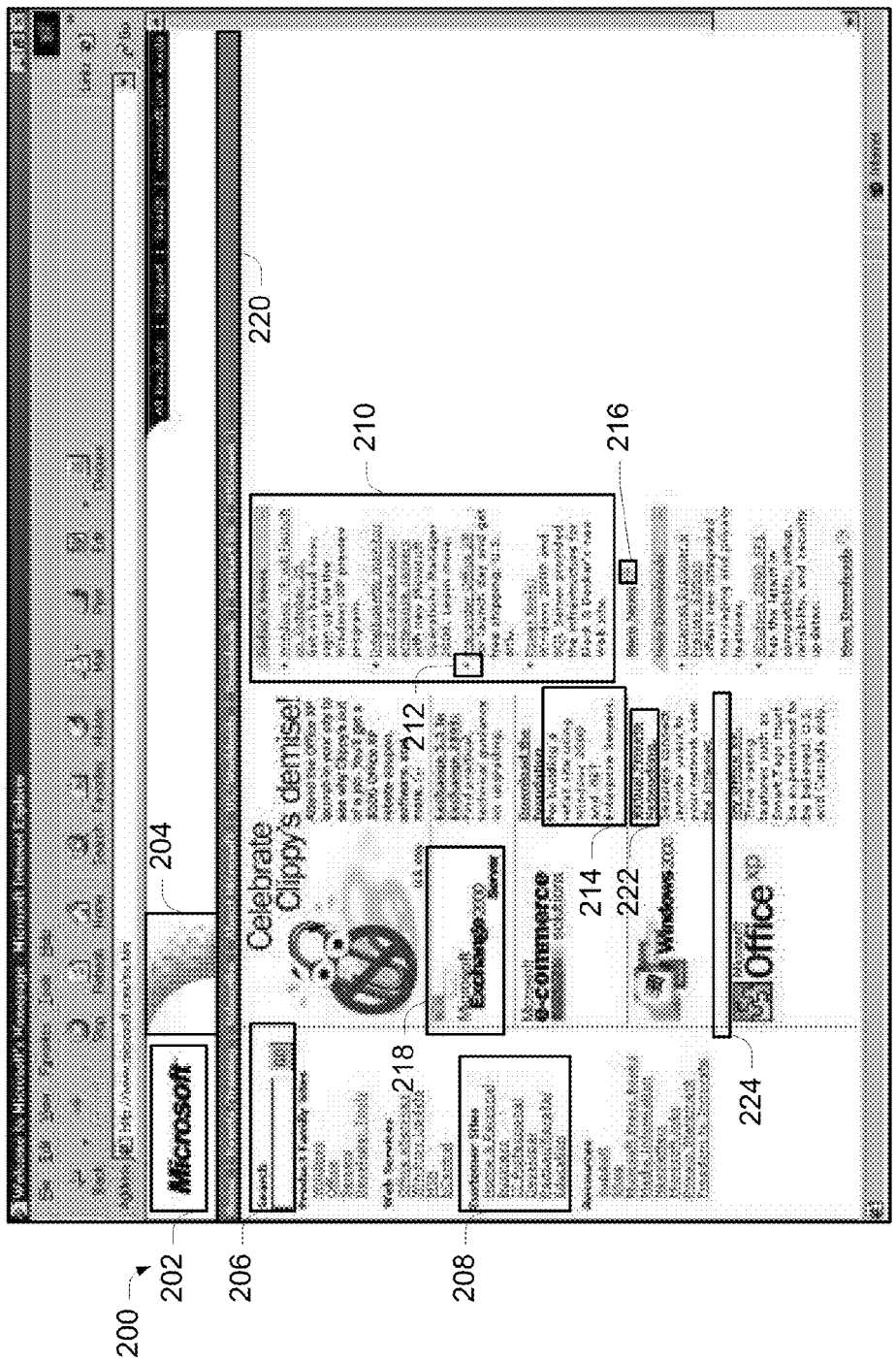
FIG. 2 is a diagram of an exemplary web page that illustrates exemplary objects in accordance with one or more embodiments.

FIG. 2 shows a web page 200 in the form of an index page that comprises multiple different objects 202-224, at least some of which comprise basic objects. These objects do not constitute all of the objects embodied by the web page. Rather, the enumerated basic objects are for illustrative purposes only.

As an example of a function-based object model, the function-based object model of basic object 214 can be described as follows:

Presentation:
    Layout Format: Left Aligned . . .
    Media Type: Text
    Encoding: Language: English, Content Type: Text/HTML . . .
Semanteme: Abstract
Hyperlink: No Hyperlink
Decoration: 0
Interaction: Display Basic Function-Based Object Model of a Composite Object In the illustrated and described embodiment, a "composite object" comprises a set of objects (either basic objects or other composite objects) that perform some certain functions together. These objects are combined under some basic clustering rules. Since a web page is composed of composite objects and basic objects, and a website is a set of web pages, websites and web pages can themselves be composite objects.

In accordance with the described embodiment, the notion of a full representation is used to describe a tree-like structure that represents a composite object that has been unfolded to ascertain all of the children that comprise basic objects. As a composite object can itself contain other composite objects, this unfolding process can be a repeated process until all of the children comprising basic objects are discovered. A "root child" is a child that connects with the root directly. Root children are said to be "brother objects" to each other.

With respect to the functions of a composite object, such objects can have all of the functions of a basic object. Composite object also have additional functions. Specifically, composite objects can have a clustering function. The root children of a composite object are clustered based on some basic rules to perform certain goals that reflect an author's intention regarding the relationship and hierarchy of the root children.

Based on the clustering function, a composite object has its basic properties as follows and as set forth in FIG. 1:

Clustering Relationship
  Complement: root children of a composite object are complementary to achieve a goal, and, they have different basic properties.
  Parallel: root children of a composite object are of equal importance in achieving a goal, and, they generally have the same basic properties. If the root children have both similar and different properties, their relationship will be calculated by a weighted sum of the similarity of these properties. Then, a threshold will be set to decide whether they are complementary or parallel.
  Table: root children of a composite object can be clustered into parallel root children according to two semantic dimensions (normally row/column headers of a table).
Presentation Relationship: presentation order (time and space) of root children inside a composite object, and whether the root children are separable when they are presented. That is, whether the components should be displayed at the same time or different times, and whether they should be displayed as a whole or not.

Based on the properties described above, the function-based object model of a composite object is as follows:

CO={$O_i$, Clustering Relationship, Presentation Relationship|$O_i$ is the Root Children of the CO, i=, 1, 2, ..., $N_R$}, where $N_R$ is the total number of Root Children of the CO.

Figure 3:
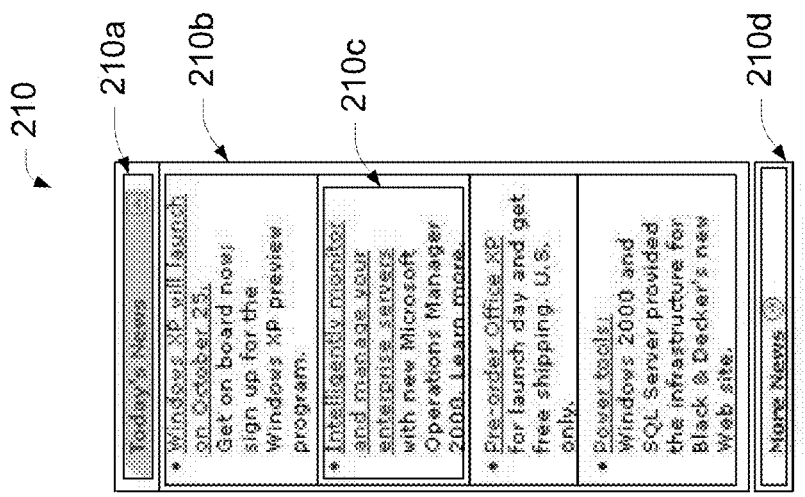
FIG. 3 is a diagram of an exemplary composite object, and illustrates various objects that comprise the composite object.
Figure 4:
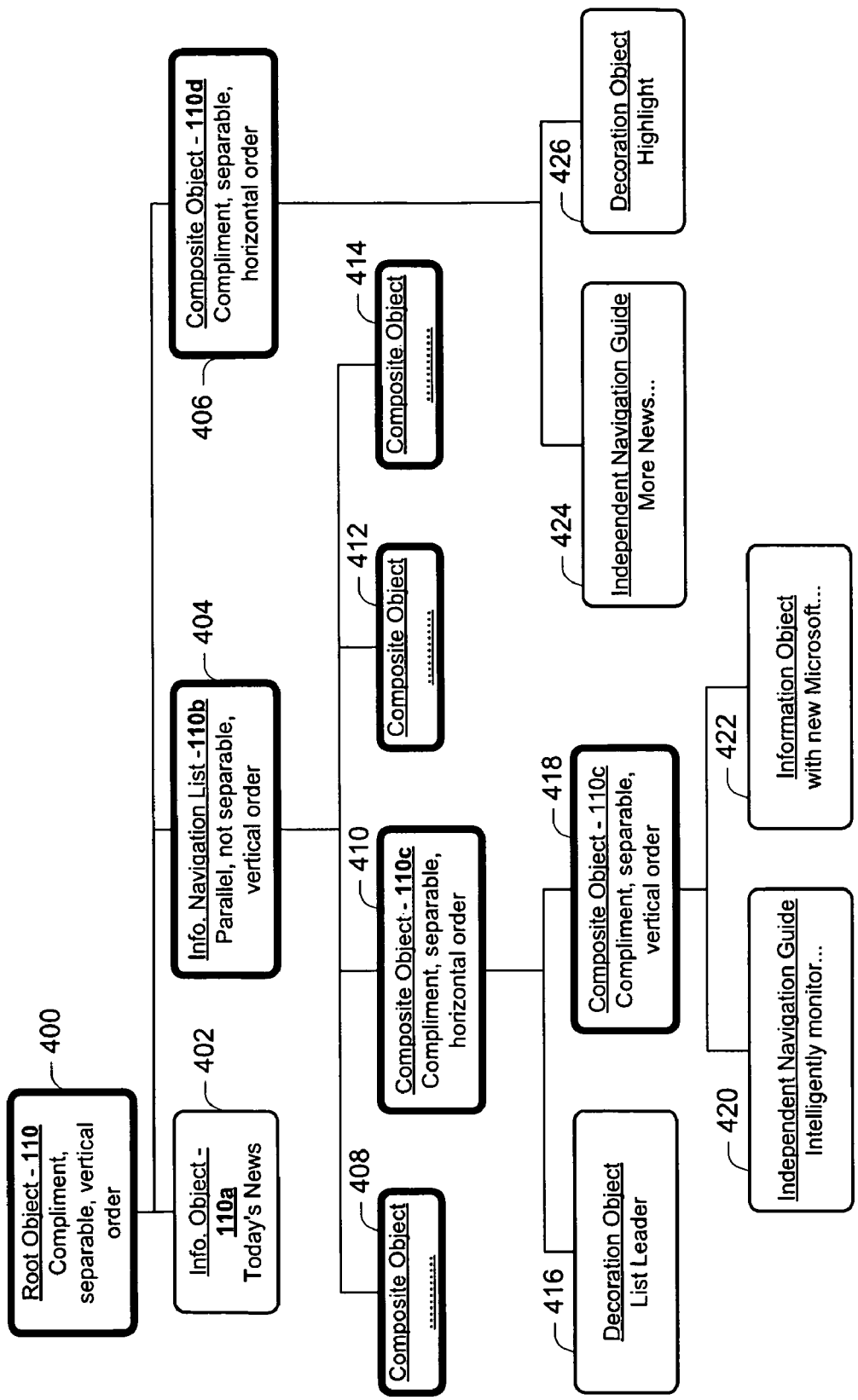
FIG. 4 is a diagram of an exemplary full representation in accordance with one embodiment.

To assist in further understanding composite objects, the reader is referred to FIG. 3. There, various objects within and comprising part of composite object 210 are designated respectively at 210a, 210b, 210c, and 210d. The function-based object model for object 210 is as follows:

Root Children: 210a, 210b, 210d
Clustering Relationship Complement
Presentation Relationship Vertical; Separable FIG. 4 shows a somewhat abbreviated full representation of object 210. There, the composite objects are designated by the darker boxes. Notice that the various composite objects are broken down into their basic object constituent parts. For example, notice that root object 400 comprises three root children 402, 404, and 406 corresponding respectively to objects 210a, 210b, and 210d. Child 404 comprises four children (408, 410, 412, and 414), each of which are composite objects themselves. Child 410 comprises two children—one child 416 corresponds to a basic object, the other child 418 corresponds to a composite object. Child 418, in turn, has two children 420, 422, each of which comprises a basic object.

Specific Function-Based Object Model—Category of an Object

In accordance with the described embodiment, the specific function of an object in a given application environment is represented by its category, which reflects an author's intention directly. There can be many object categories according to various purposes. In the discussion below, the HTML content of the FIG. 2 web page is utilized as an example to describe various object categories.

Exemplary Object Categories

Information Object: presents content information. An example of an information object is object 214.

Navigation Object: provides a navigation guide. An example of a navigation object is object 218. In addition, there are different sub-categories of navigation objects as follows:
  Navigation Bar: a composite object with parallel navigation objects as root children. The composite object exists in a set of web pages in the website to provide a global navigation guide. A navigation bar has the following formats: Normal Navigation Bar, Frame, Menu (e.g. object 220) and Map.
  Navigation List: a composite object with parallel navigation objects as root children. The composite object exists only in a single web page to provide local navigation guide. A navigation list has the following format: Normal Navigation List (object 208), Informative Navigation List (object 210), Narrative Navigation List and Map List. In an Informative Navigation List, each navigation object is followed by an information object as an introduction. In a Narrative Navigation List, all navigation objects are embedded in a piece of narrative information.
  Independent Navigation Guide: an object with a hyperlink property and/or introductory information to provide a navigation guide to a certain piece of content. An independent navigation guide generally has weak relationship with other objects around it. An example of an independent navigation guide is object 222.

Interaction Object: provides user side interaction and has the following formats: User Selection (for selecting items from a list of available information), User Query (for inputting query information, e.g. object 206) and User Submission (for uploading information).

Decoration Object: serves for decoration purpose only (e.g. object 204) and can have the following format: Separator (e.g. object 224), List Leader (e.g. object 212), Highlight (e.g. object 216) and Background Special Function Object: performs special functions such as AD (advertising), Logo, Contact, Copyright, Reference, etc.

Page Object: serves as the basic document of a website for presenting related information and has two basic sub-categories: Index Page and Content Page.
  Index Page: serves mainly as navigation guide to other pages. The web page of FIG. 2 is an example of an index page.
  Content Page: delivers semantic information to the user.

Automatic Function-Based Object Model Analysis for HTML Websites

Although it is desirable, in the authoring phase, for authors to add additional information for purposes of assisting in the generation of function-based object models, authors actually tend to not do so. In addition, many authors would likely prefer to not be burdened with such extra tasks. Thus, it becomes important, in some embodiments, to automatically analyze the function of content in a website. In the discussion below, an automatic method for generating basic and specific function-based object models, such as those described above, is described. Although the discussion is focused on HTML websites, it is to be appreciated and understood that the described approach can be extended to other languages.

Basic Function-Based Object Model Generation

Before a basic function-based object model (such as that which is described above) is generated, the objects are first detected. In HTML content, a basic object is a non-breakable element within two tags, or an embedded Object. There is no other tag inside the content of a basic object. According to this criteria, it is a fairly simple task to ascertain all of the basic objects inside or comprising a website.

Based on the observation that objects in the same category generally have consistent visual styles, and they are separated by apparent visual boundaries from objects in other categories, composite objects can be detected by conducting a layout analysis of a web page.

Any suitable object detection techniques can be used. In the discussion that follows, an exemplary method for automatically analyzing the structure of HTML pages based on detecting visual similarities of objects is described. It is to be appreciated and understood that the described approach constitutes but one exemplary way in which this can be done.

Visual Similarity of HTML Objects

In the HTML environment, it is fairly common for content to be divided into categories where each category holds records of similar or related subtitles. In addition, records in one category are normally organized in a manner having a consistent layout style. The basic idea of the approach about to be described is to detect these visual cues, records and categories. In this specific context of object detection, the following terms will be used:

Basic object: Non-breakable visual HTML objects that do not include other tags (such as texts or tags as <IMG>, <HR>) or are representations of one embedded media object.

Composite object: An ordered set of objects that consists of at least one basic object or other composite object and these objects must be adjacent if they are rendered. The order of these elements is normally defined by reading habits. In following discussions, we represent a composite object C as a string of elements $\{e_1, e_2, \ldots, e_n\}$, where $e_i$ comprises basic objects or other composite objects.

Group object: Special composite objects where all elements are basic objects and these elements are rendered on the same text line without deliberate line breaks by visual browsers.

List object: Special composite objects where all elements satisfy some consistency constraint.

Structured Document: documents converted to hierarchical structures of composite objects.

Visual Similarity of Basic Objects

During object detection, the HTML document is first parsed. During the parsing process, when identifying basic objects, rendering parameters are extracted by keeping a stack of tags that affect text attributes like font face, styles, size, and color. For other embedded media objects like images, information is extracted from tag attributes, or by analyzing their file headers. According to these parameters, fuzzy comparison rules are defined that assist in deciding visual similarity. Table 1 immediately below provides a few examples of some fuzzy comparison rules that can be used for text objects, in which x is the similarity between objects.

TABLE 1

Starting from x = 1.0

Compare key attributes (like <H1> ... <H6>, <A>):

$$x = x \cdot \begin{cases} \text{Key\_Modifier,} & \text{Not Equal} \\ 1, & \text{Equal} \end{cases}$$

Compare font size attribute: $x = x \cdot \begin{cases} \text{Size\_Modifier} & \text{Not Equal} \\ 1, & \text{Equal} \end{cases}$ TABLE 1-continued

...

Compare text length: $x = x \cdot \left( \frac{\min(\text{length1}, \text{length2})}{\max(\text{length1}, \text{length2})} \right)^{Adjust\_factor}$ Visual Similarity of Composite Objects The visual similarity of composite objects is based on that of basic objects. To keep appropriate semantic granularities, group objects are defined as content that is considered tightly related from our visual cue-based view (such as sentences and paragraphs). Group objects are not broken up during the analysis. A basic object is treated as a composite object with only one element when it is compared with other composite objects. In addition, list objects have their specialties because we use them to represent detected categories and records. And instead of using whole objects, we pick typical elements from list objects to compare with others.

In the illustrated example, two kinds of visual similarity measurements are defined:

Approximate Similarity: Comparison of two strings that enables weighted mismatches and omissions.

Parallel Similarity: Comparison of two strings that enables only weighted mismatches.

From the definitions above, it will be appreciated that an approximate similarity is more robust than a parallel similarity, if there are outliers in strings. Parallel similarity can simply be an O(n) one-by-one comparison. Approximate similarity can be a bit more complex. Pseudo code of a suitable approximate similarity measurement algorithm is listed below in Table 2, and will be understood by those of skill in the art. In the solution, dynamic programming is used to solve the problem.

TABLE 2

Approximate String Compare Algorithm

```
compareItem(x, NULL) = skip_weight(x);
compareItem(simpleX, simpleY) = defined by Table 1;
compareItem(strI[1..lthI], strJ[1..lthJ])
{
    dim cmp[0..lthJ];
    cmp[0] = 1; lastv10 = 1;
    for(j=1; j<=lthJ; j++) {
        cmp[j] = cmp[j-1] * compareItem(NULL, strJ[j]));
    }
    for(i=1; i<=lthI; i++) {
        lastv11 = cmp[0];
        cmp[0] = lastv10 * compareItem(strI[i], NULL);
        lastv10 = cmp[0];
        for(j=1; j<=lthJ; j++) {
            v11 = lastv11 * compareItem(strI[i], strJ[j]);
            v10 = cmp[ j ] * compareItem(strI[i], NULL );
            v01 = cmp[j-1] * compareItem(NULL, strJ[j]);
            lastv11 = cmp[j];
            cmp[j] = max(v11, v10, v01);
        }
    }
    return cmp[lthJ];
}
```

Pattern Detection and Construction of Document Structures

Visual similarity patterns do not appear as very stable forms even with so-called "well composed" web pages. Their lengths can change, and outliers in sequences are common. In addition, typically there are not known boundaries to separate potential patterns. In the approach about to be described, we start from an exact pattern detection method based on suffix trees, and then we expand exact patterns according to approximate similarity. Each time a composite object is constructed, it is checked for potential patterns. These patterns are then converted to list objects. Adjacent list objects are checked for visual similarities and are merged if they are similar.

In the discussion that follows, some of the terms that are used are defined as follows. For composite object $C=\{e_1, e_2, \ldots, e_n\}$, an object o is represented by a sub-string of C as $\{e_s, \ldots, e_{s+l-1}\}$. Visual pattern p is represented as a set of "equal" objects $\{o_1, \ldots, o_m\}$ and sometimes represented by a typical element $o_p$ of the pattern. We also follow some heuristics as listed below for locating possible patterns.

Equal Judgment Two objects are equal only if their similarity measurement is above a threshold $E_p$.

Minimal Frequency One pattern must contain at least $F_p$ objects.

No Overlap Objects in one pattern do not overlap with each other.

Alignment: Objects in one pattern are normally aligned tidily (no zigzags).

Paragraphs: Content that resides in the same unbroken text line should be tightly related and thus will be treated as one element.

Minimal Deviation Standard deviations of objects' distributions (positions) and lengths in potentially better patterns should be smaller.

Maximum Coverage The potentially better patterns should have bigger coverage of elements in C.

Sub-pattern Replacement: If all objects in a pattern are concatenations of "equal" sub strings (sub-pattern), then these objects are expanded to sub-strings. Assume a pattern as $\{\{e_l, \ldots, e_m\}, \{e_{m+l}, \ldots, e_{m+k}\}, \ldots\}$ and $e_i = e_j, \forall i,j$, then the pattern is expanded to $\{e_l, \ldots, e_m, e_{m+l}, \ldots, e_{m+k}, \ldots\}$.

Significant Token Records in one category should have similar prefix elements.

Quantization

To reduce the complexity of frequency counting, we first cluster candidate elements according to similarity measurements between each element. These clusters are then labeled with unique identifiers. Elements in the same cluster are assigned with the same identifier, and are considered as equal to each other. A clustering algorithm such as the one described in Easter et al., A Density-Based Algorithm for Discovering Clusters in Large Spatial Databases with Noise", In Proc KDD'96, 1996, can be used because we do not know the number of possible clusters at the beginning. Another reason is that our heuristics have specified two values ($E_p$ and $F_p$) that are just the epsilon and minimal density.

Eps-neighbourhood: $N_{Eps}(e)=\{e' \in C | similarity (e,e') \geq E_p\}$, where $E_p$ is from "equal judgment". (It will be the same as originally defined in Easter et al., if we use $1/similarity(e,e') \leq 1/E_p$ as the condition.)

Core point condition: $|N_{Eps}(e)| \geq F_p$, where $F_p$ is defined by "minimal frequency".

For $C=\{e_1, e_2, \ldots, e_n\}$, if the clustering result is m clusters as $T_1=\{e_a, e_b, \ldots, e_x\}, \ldots T_m=\{e_s, e_t, \ldots, e_y\}$, we construct a token string $T=\{t_1, t_2, \ldots, t_n\}$ with $t_i$ equal to the cluster identifier that $e_i$ belongs to. The token string is then passed to the frequency counting stage. In following discussions we use an example as $C=\{e_1, e_2, \ldots, e_{13}\}$ and clustering result as $T=\{C, A, B, D, A, B, E, D, A, B, C, A, B\}$ with 4 clusters labeled as ABCD and one outlier labeled as E. (In this illustrated example, a minimal frequency of 3 is selected. Thus only AB can be clusters and CDE are all noise.)

Frequency Counting

Frequencies of quantized patterns are counted efficiently using a suffix tree representation of token string T. Starting from the root node, the "label of path" of a node is actually what we called a "pattern", and leaves under the node are positions of the pattern in a string. The number of leaves under each node is the frequency of the pattern. Table 3 below gives an example of pattern counting. A suitable algorithm to create the suffix tree is described in Ukkonen, *On-line Construction of Suffix Trees*, Algorithmica, 14(3), September 1995, pp. 249-260.

TABLE 3

Pattern frequency counting of sequence 'CABDABEDABCAB'

Selection and Confirmation

From the results of the frequency counting, the best patterns are selected based on heuristics. Using Table 3 as an example, patterns {A, B} and {B} are good candidates. And {A, B} is superior to {B} according to the heuristic "maximum coverage". However {A, B} can only cover a part of the elements because of outliers such as {C, D, E}. To cope with these outliers these patterns are expanded based on approximate similarity measurements and the heuristic "significant token". Currently a naïve method is used—starting from a strict pattern, we try to append succeeding elements after each object of the pattern. The consistency of the pattern is checked during the process and it stops if an appendant breaks the consistency. To illustrate the process, the steps of expanding pattern {A, B} are listed as follows:

$\{e_1, \{e_2, e_3\}, e_4, \{e_5, e_6\}, e_7, e_8, \{e_9, e_0\}, e_{11}, \{e_{12}, e_{13}\}\}$—> the original pattern {A,B}

$\{e_1, \{e_2, e_3, e_4\}, \{e_5, e_6\}, e_7, e_8, \{e_9, e_{10}\}, e_{11}, \{e_{12}, e_{13}\}\}$—> one element appended

. . .

$\{e_1, \{e_2, e_3, e_4\}, \{e_5, e_6, e_7\}, e_8, \{e_9, e_{10}, e_{11}\}, \{e_{12}, e_{13}\}\}$—> final result From the example we can see that heuristic "significant token" might sometimes miss possible patterns such as $\{\{e_1, e_2, e_3\}, \{e_4, e_5, e_6, e_7\}, \{e_8, e_9, e_{10}\}, \{e_{11}, e_{12}, e_{13}\}\}$, which do not have a "significant token" at the beginning.

Construction of a Structured Document

Structured documents are constructed in a recursive manner. Starting from basic objects and group objects, these elements are divided into potential composite objects roughly based on block-level tags. Then, the pattern detection algorithm is applied to elements of these potential composite objects, and detected patterns are converted to list objects. For example, using composite object and patterns of the section entitled "Selection and Confirmation" above, a new composite object can be created as $\{e_1, \{\{e_2, e_3, e_4\}, \{e_5, e_6, e_7,$ $\{e_9, e_{10}, e_{11}\}, \{e_{12}, e_{13}\}\}\}$ where the underscored element is a list object. Note that outliers between two list elements are appended as do-not-cares. The composite objects are then expanded to upper levels by merging objects on the same level if they are not enclosed in important structures. After expanding, a check is performed to ascertain whether two adjacent list objects are similar and, if so, they are merged into one. The whole process then repeats until <BODY> of HTML document has been processed. The final composite object is the structured document.

Special Considerations for HTML Tables

In this section, application of the above-described visual cue-based method for analyzing structures of HTML tables is described. Tables are the most frequently used layout tools of HTML pages. From regular data tables to general content layouts, tables provide a powerful way to control positions and alignments. Typical approaches such as that described in Hammer et al., *Extracting Semistructured Information from the Web*, Proc. Workshop on Management of Semistructured Data (PODS/SIGMOD'97), May 1997, require manually specifying rules and pattern strings to locate wanted data. Further, methods such as those described in Lim et al., *An Automated Approach for Retrieving Hierarchical Data from HTML Table*, In Proc. CIKM'99, 1999, Kansas City, Mo., pp. 466-474, take further steps by automatically analyzing data tables with titles and headers. These approaches, however, do not automatically decide if a table is data table.

As data tables are normally organized tidily, they should hold very strong visual similarity patterns. In addition, many general content tables also hold strong visual cues. The alignment nature of tables is thus used as a starting point for structural analysis. We start by counting the rows and columns of a table. All empty rows and columns are stripped, since these are only for spacing and other layout purposes. Subsequently, we check for rows and columns because column-wise and row-wise organizations are quite common for data tables. The first check determines whether the table gets heading and footing rows and columns (such as that specified by <TH> <THEAD> <TFOOT> tags). These tags are normally used when the table is a column-wise or row-wise data table. Then, the elements in rows and columns are compared to check if similarity consistency holds. If none of the above checks is successful, a more aggressive method is used. Specifically, the table is divided into smaller rectangular blocks and these blocks are checked for similarity consistency. The table is passed back to the pattern detector if all efforts fail.

Having detected the objects in a webpage, the function-based object models can now be generated.

Basic Function Object Model Generation for a Basic Object

The functional properties of a basic object are generally included in its HTML source content. Hence, by examining the HTML source content, the functional properties of the basic objects can be ascertained. In the specific HTML context, such can be accomplished by defining some basic rules and then programmatically using the rules to identify the functional properties. The following discussion describes some specific rules that pertain to, in this specific context, generation of a basic function-based object model for a basic object.

The presentation property can be determined by analyzing the HTML source and tags to extract the Media Type, Encoding Format and Layout information of an object.

The semanteme property can be determined by analyzing the content itself to extract the semantic layer.

The navigation property is the destination of a hyperlink contained in a basic object.

The decoration property varies between [0,1] according to the presentation and semanteme properties. Text/Video objects normally have a lower decoration value. The following objects generally have higher values to indicate that their main purpose is for decoration: general decoration symbols, lines and separators between objects, and objects with a "Background" property in an HTML tag.

The interaction property of a basic object can be one of the following three categories:
  Button for Object with the <button> tag and/or some button-like selection list.
  Input Text for Object with <Input . . . > or related tags.
  Display for interaction property of other Objects.

Basic Function Object Model Generation for a Composite Object

The following are some basic rules, in this specific context, for generating the basic function-based object model of a composite object:

The clustering relationship can be one of the following three categories:
  Complement: the root children are neighbors and have one or more different basic properties (such as Presentation or Semantic Layer).
  Parallel: the root children are neighbors and have similar basic properties.
  Table: the root children have a table tag and 2-dimensional clustering headers (column and row header).

Presentation Relationship
  Time Order: generally no time sequence unless required by the Object.
  Space Order can be determined by analyzing the visual image of the content.
  Root children are generally separable except special cases (such as Object for input).

Specific Function-Based Object Model Generation

Specific Function-Based Object Model Generation for a Basic Object

As described above, the specific function-based object model represents an object with its category. For a basic object, its category is mainly determined by the major properties of the basic object and the properties of the father/brother objects. In the illustrated and described embodiment, a rule-based decision tree is applied to determine the category of basic object.

Figure 5:
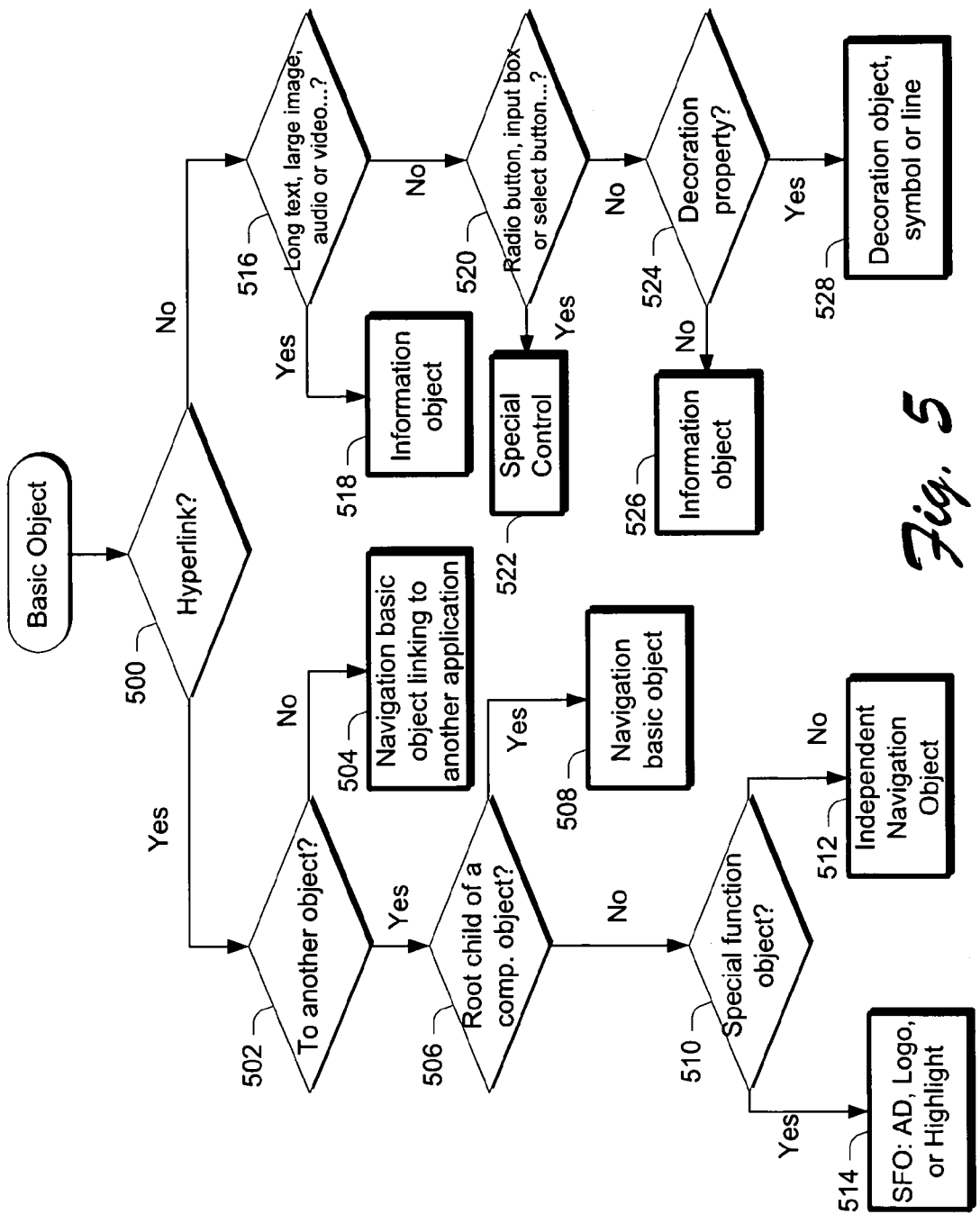
FIG. 5 is a flow diagram of a decision-making process in accordance with one or more embodiments.

As an example of a rule-based decision tree that can be utilized to ascertain the category of a basic object, consider FIG. 5.

Step 500 determines whether the basic object comprises a hyperlink. If it does, then step 502 determines whether the basic object comprises a hyperlink to another object. If the basic object is not a hyperlink to another object, then step 504 categorizes the basic object as a navigation basic object that links to another application. If, on the other hand, step 502 determines that the hyperlink is a link to another object, then step 506 determines whether the object is a root child of a composite object. If the object is a root child of a composite object, then step 508 categorizes the object as a navigation basic object. If, on the other hand, the object does not comprise a root child of a composite object, then step 510 determines whether the object is a special function object. If so, then step 514 categorizes the object as a special function object. If the object is not a special function object, then step 512 categorizes the object as an independent navigation object.

If, at step 500, the object is not determined to be a hyperlink, then step 516 determines whether the object comprises long text, large images, audio or video, or the like. If so, step 518 categorizes the object as an information object. If, on the other hand, none of these criteria are met, then step 520 determines whether the object comprises a radio button, input box, select box or the like. If the object does comprise one of these items, step 522 categorizes the object as a special control. If, on the other hand, the object does not comprise one of these items, step 524 determines whether the object comprises a decoration property. If not, then step 526 categorizes the object as an information object. If the object does comprise a decoration property, then step 528 categorizes the object as a decoration object, symbol, line or the like.

Specific Function-based Object Model Generation for a Composite Object

The category of a composite object can be determined by the major properties of the composite object and/or its root children, as well as the application environment. Each different category can utilize a specific detection method that is specifically drawn along lines that are associated with that category. The specific detection methods can accordingly include one or more rules against which the various objects are tested to ascertain their category.

In the discussion that follows, and to assist the reader in appreciating this aspect of the described embodiments, two specific examples are given. The first example pertains to detecting and categorizing a normal navigation bar, and the second example pertains to detecting and categorizing a page. As will be appreciated and understood by those of skill in the art, the general principles of the examples about to be described can be extended to other categories.

Example 1

Navigation Bar Detection

According to its media type, a normal navigation bar can be classified as either a "text" normal navigation bar or an "image" normal navigation bar. In this specific example, the focus will be on rules that detect a text normal navigation bar. Of course, an image normal navigation bar can also be detected with a similar method.

To ascertain whether a navigation bar is a text normal navigation bar in a website, the following rules can be employed.

| Rules for Text Normal Navigation Bar (NNB) | |
|---|---|
| Rule 1 | Most of the root children of a Text NNB should be navigation objects. That is: ($N_N/N_R$) should be not less than $H_{min}$, where $N_N$ is the total number of navigational root children, and $N_R$ is the total number of root children. |
| Rule 2 | Root children text length should be less than $L_{max}$. |
| Rule 3 | Text NNB appearance times in the website should be not less than $R_{min}$. |
| Rule 4 | Root children of a Text normal navigation bar should have similar properties. |
| Rule 5 | Root children of a Text normal navigation bar should have hyperlinks all to either outside or inside, only a small percentage of deviation $D_{max}$ is allowed. |

The constant variables above such as $H_{min}$, $L_{max}$, $R_{min}$ and $D_{max}$ are variable values that can vary in different websites according to the practical detection result.

Based on the rules above, a detection algorithm can be easily programmed. Small deviations can be allowed for the binary conditions in practical detection. That is, even if one of the values is slightly on the wrong side of a threshold, the corresponding text normal navigation bar can be accepted if all the other values are well away from their thresholds.

Example 2

Page Category Detection

As described above, a web page has two basic categories: Index Page and Content Page. Presented here is a hyperlink-based page category detection method, which is effective for all languages based on XML.

In accordance with this method, the so-called "out degree" and "in degree" of a web page are defined. The out degree is the number of hyperlinks inside the page. The in degree is the number of web pages with hyperlinks to the current page in the whole website.

Using statistical analysis, it has been ascertained that a page with a relatively large out degree or in degree may be an index page, and a page with a relatively small out degree and in degree may be a content page. That is, for a given page with an out degree (OD) and an in degree (ID), the following rules can be used:

If OD>OD0 or ID>ID0, the page can be considered as an Index Page; and

If OD<OD0 and ID<ID0, the page can be considered as a Content Page, where, OD0 and ID0 are two constant variables determined by the website.

To find OD0 and ID0, we first sort the pages by OD and ID in descending order, respectively, and graph a corresponding OD(i)-i and ID(i)-i diagram of a website (i is the ordered number of a web page).

Figure 6:
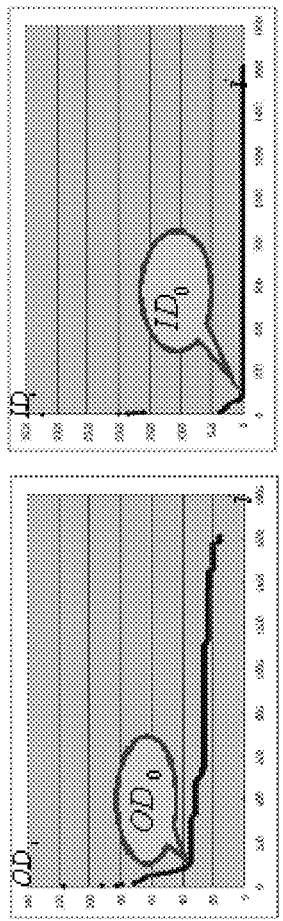
FIG. 6 is a graph that is useful in understanding aspects of one or more embodiments.

FIG. 6 gives an example of an OD(i)-i and ID(i)-i diagram for Yahoo's Chinese news website (1,615 pages in all). By statistical analysis of many websites, it has been determined that OD0 and ID0 correspond to the inflexion points in the OD(i)-i and ID(i)-i diagram as shown in FIG. 6.

Once the graphs of the corresponding OD(i)-i and ID(i)-i are made, there are two methods that have been found useful to ascertain OD0 and ID0.

Figure 7:
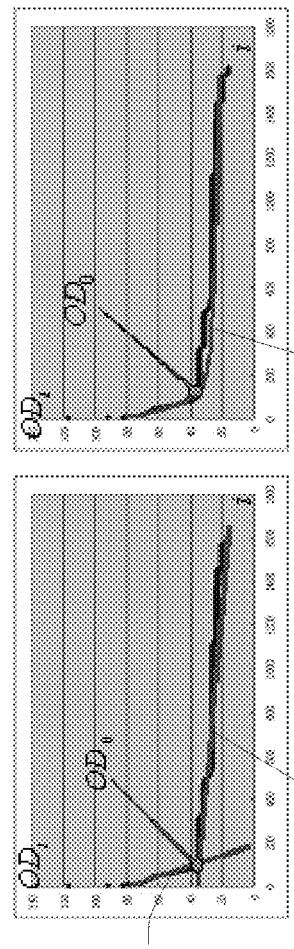
FIG. 7 is a graph that is useful in understanding aspects of one or more embodiments.

The first method is referred to as a "beeline simulation", and is best understood in connection with FIG. 7. There, the graphed diagram is simulated with two beelines 700, 702. That is, the average distance between the beelines and the original curve of OD is minimized. Then the OD0 is calculated as the y-coordinate of the intersection of the lines 700, 702.

Figure 8:
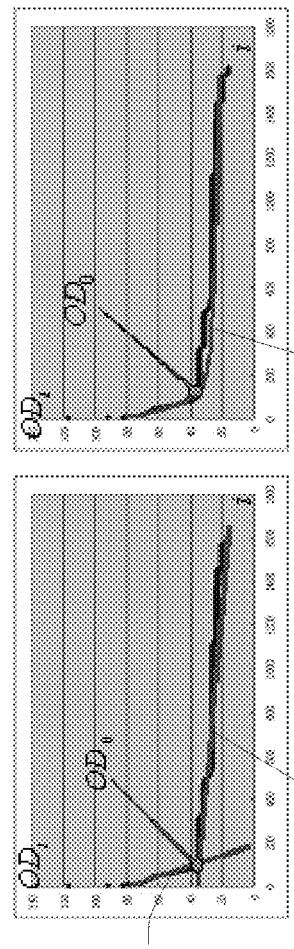
FIG. 8 is a graph that is useful in understanding aspects of one or more embodiments.

The second method is referred to as a polynomial simulation and is best understood with reference to FIG. 8. There, the graphed diagram is simulated with a polynomial curve 800 (second power or more). That is, the average distance between the polynomial and the original curve of OD is minimized. Then, the y-coordinate of the inflexion with the largest curvature of the polynomial curve is designed as OD0.

Exemplary Method

Figure 9:
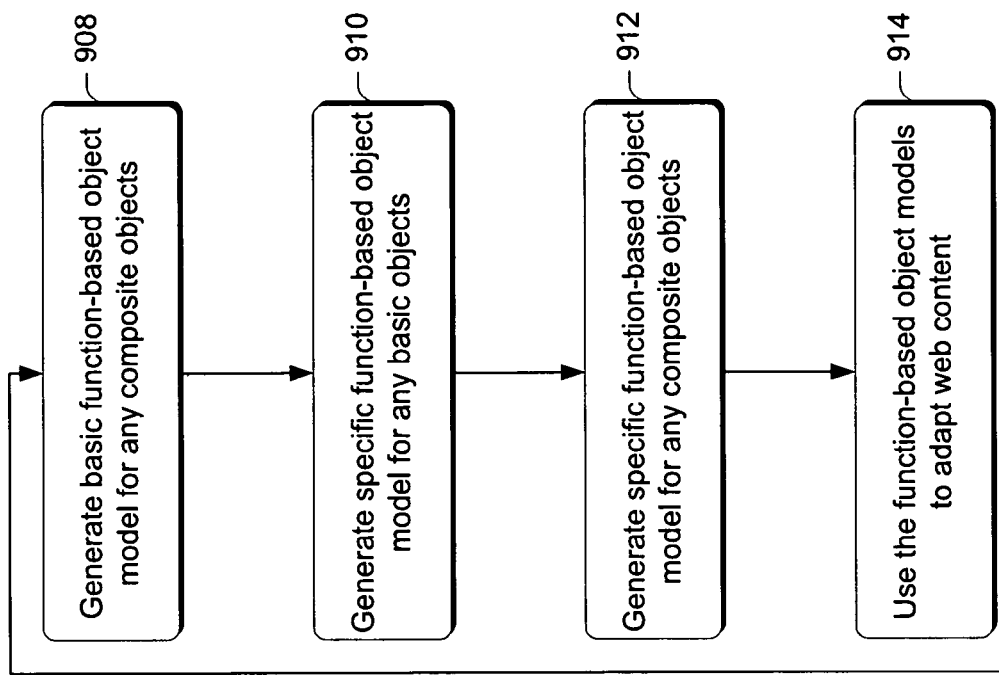
FIG. 9 is a flow diagram of steps in a method in accordance with one embodiment.
Figure 9:
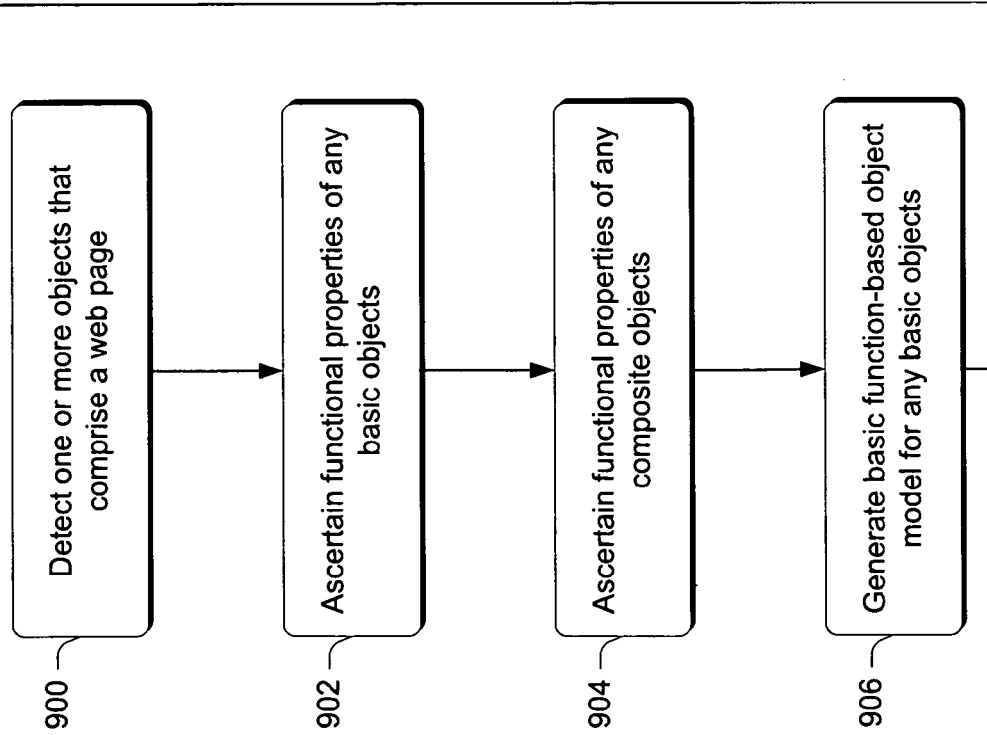

FIG. 9 is a flow diagram that describes steps in a method in accordance with the above-described embodiments. The method can be implemented in connection with any suitable hardware, software, firmware or combination thereof. In the illustrated and described example, the method is implemented in software. The method can be implemented by, among other types of computing devices, suitably configured client devices, as well as suitably configured servers that serve up web pages to client devices.

Step 900 detects one or more objects that comprise a web page. Exemplary objects are described above in the form of basic objects and composite objects. The exemplary objects are not intended to limit the objects that can be detected, or the object types that can be detected. Rather, the specifically discussed and described basic and composite objects are simply given as examples to illustrate the inventive approach. In addition, the objects can be detected in any suitable way. Specific examples of how this can be done in but one specific context are given. It is to be understood and appreciated that these specific examples are not to limit application of the claimed subject matter to either specific detection paradigms or detection of particular types of objects (e.g. HTML objects). Once detected, step 902 ascertains functional properties associated with any basic objects or first object types. Non-limiting examples of how this can be done are given above. Step 904 ascertains functional properties associated with any composite objects or second object types. Non-limiting examples of how this can be done are given above.

Step 906 generates basic function-based object models for any of the basic objects. Non-limiting examples of how this can be done are given above. Step 908 generates basic function-based object models for any composite objects. Non-limiting examples of how this can be done are given above. Step 910 generates specific function-based object models for any basic objects. Non-limiting examples of how this can be done are given above. Step 912 generates specific function-based object models for any composite objects. Non-limiting examples of how this can be done are given above. Step 914 then uses the function-based object models to adapt web content. Example of how this step can be implemented are given below.

Experimental Example

The following is an example of experiment results that were generated using an English news website. In this example, the total number of web pages was 73, in which the number of Index/Content Pages was ⅝ respectively. The OD0=22, ID0=4. Based on the algorithm above, we can get the function of all the web pages.

Figure 10:
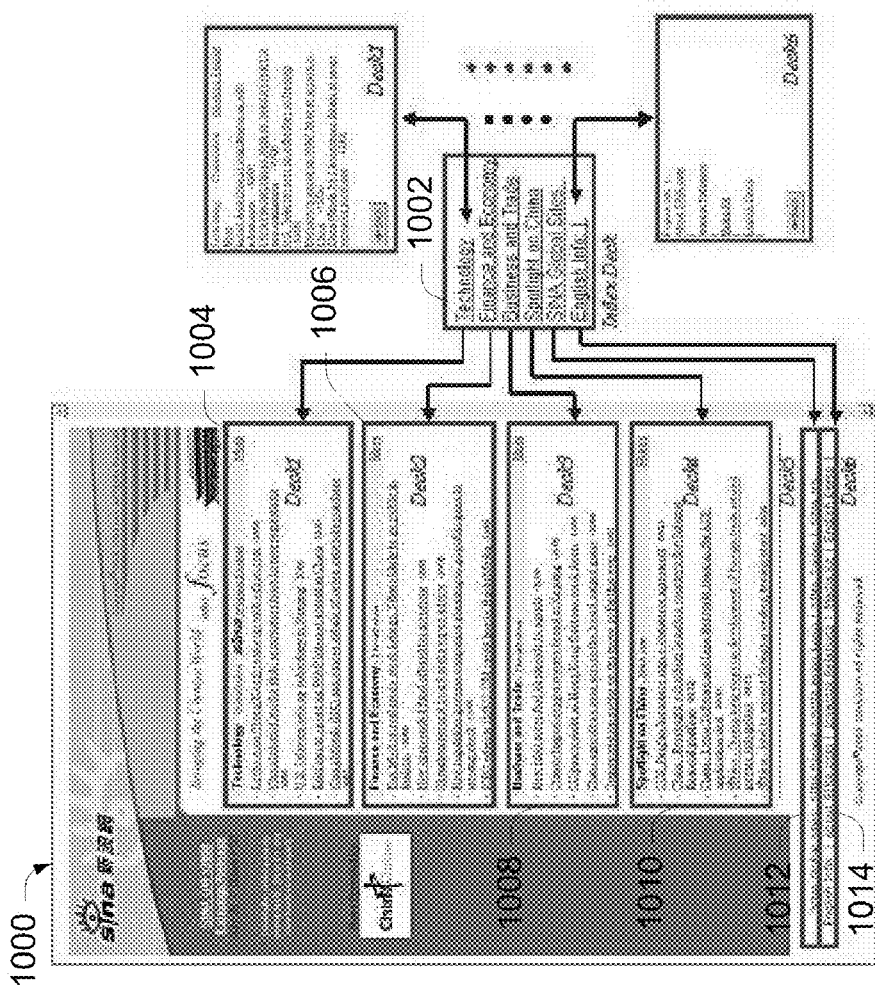
FIG. 10 is a diagram of an exemplary web page, and a diagrammatic representation of so-called decks that have been provided through an inventive adaptation process.
Figure 11:
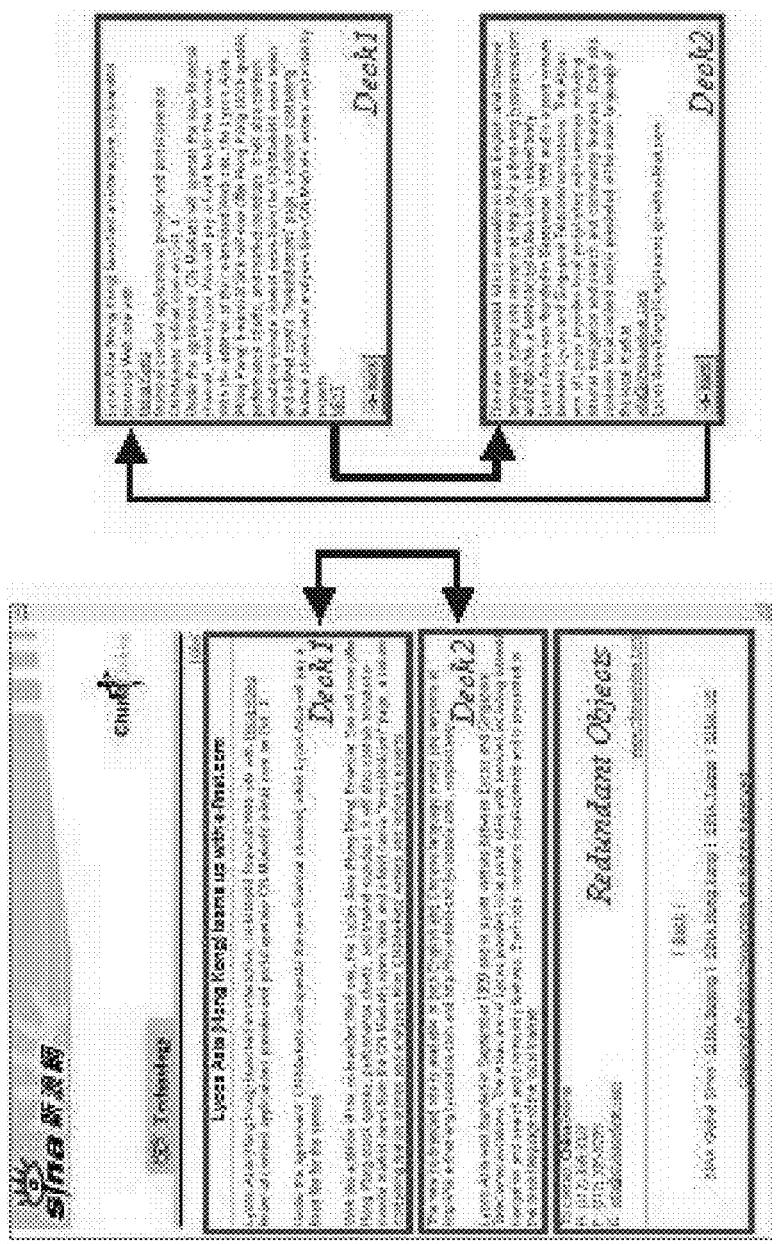
FIG. 11 is a diagram of an exemplary web page, and a diagrammatic representation of so-called decks that have been provided through an inventive adaptation process.

FIGS. 10 and 11 give examples of an Index Page (OD=36, ID=76) and a Content Page (OD=8, ID=3) in the website of this example. Since navigation bars may exist in both Index Pages and Content Pages, we can take them away from web pages before calculating the OD and ID of each page to eliminate the influence of the navigation bar. Using the above-described method, higher precisions for page category detection have been achieved over past methods, such as the one described in Pirolli et al., *Silk from a Sows Ear. Extracting Useable Structures from the Web*, Proc. CHI'96, 1996, pp. 118-125. Moreover, compared with other approaches, the described method has not only a higher precision but also better extensibility.

Content Adaptation Based on Function-Based Object Models

For practical adaptation, the described function-based object model approach can be employed in connection with some guidelines. The discussion below presents some general rules based on the basic function-based object model. In addition, some specific rules for web adaptation over WAP (Wireless Application Protocol), based on the specific function-based object model are illustrated as well.

To provide users with the same basic browsing experience, the following basic criterion have been found useful:
 Place the adapted content in the same time and space order as the original content to keep the same visual browsing experience.
 Try to align the children of a composite object together to keep the content integrity.
 Keep the original layer hierarchy to make the content structure clear.

General Adaptation Rules Based on the Basic Function-Based Object Model

Figure 12:
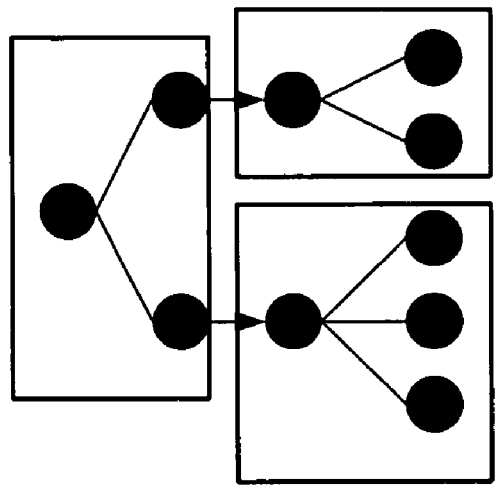
FIG. 12 is a diagram that is useful in understanding aspects of one or more described embodiments.
Figure 12:
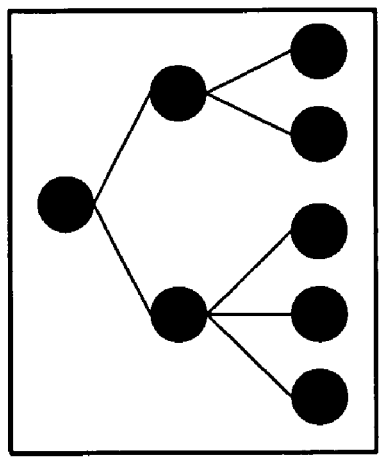
Figure 13:
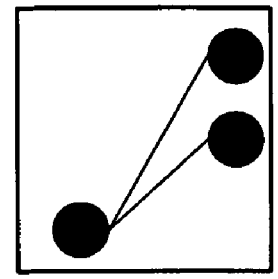
FIG. 13 is a diagram that is useful in understanding aspects of one or more described embodiments.
Figure 13:
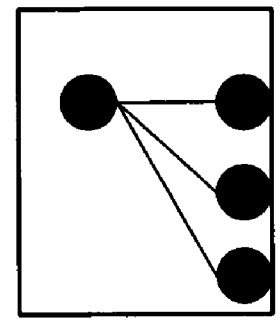
Figure 13:
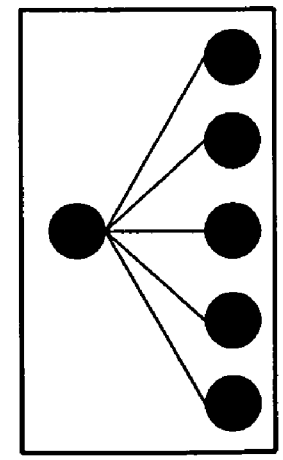
Figure 14:
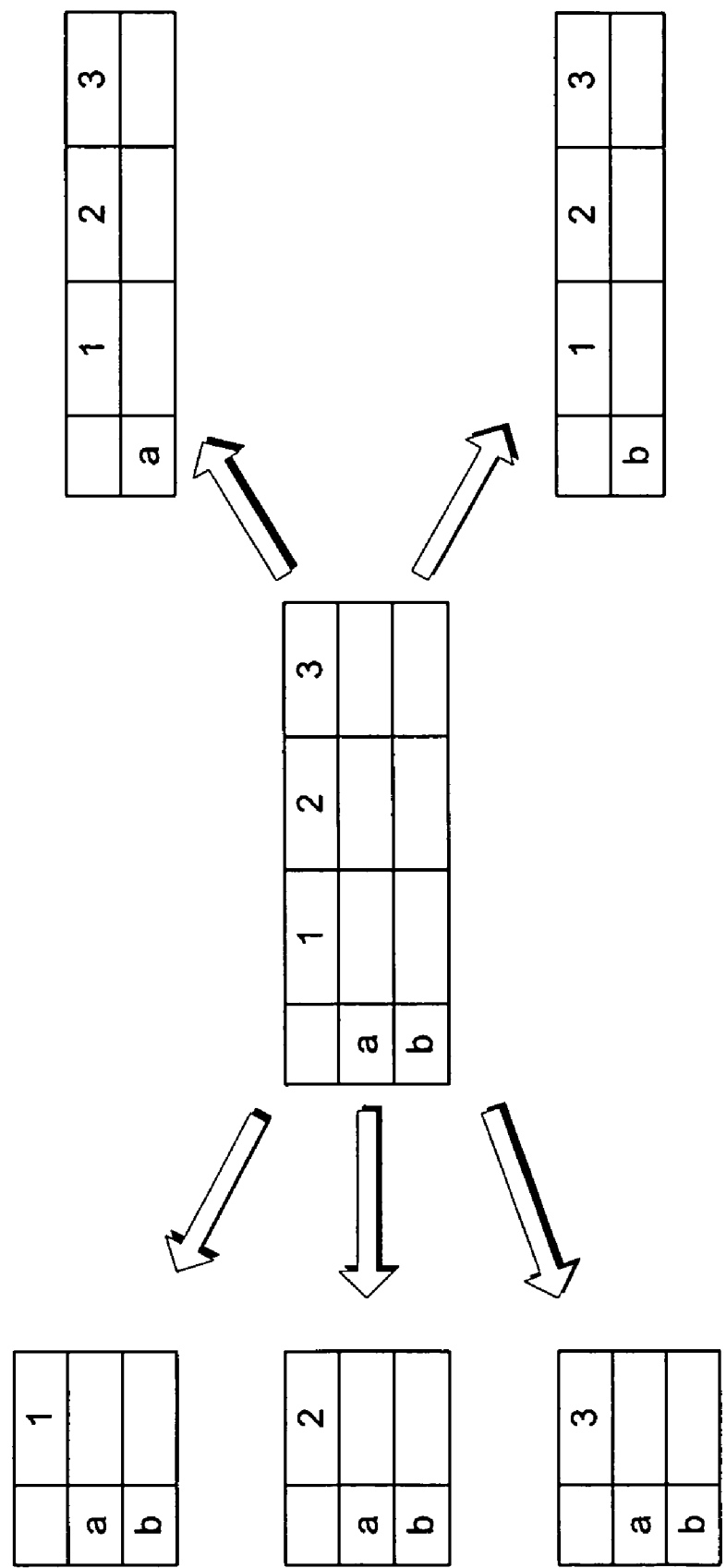
FIG. 14 is a diagram that is useful in understanding aspects of one or more described embodiments.

The following rules are exemplary rules that can be used in connection with the basic function-based object model, and are provided as examples only.
 The presentation property should be considered together with device capability and language difference to generate the most suitable Media Type, Encoding Format and Layout Format for an Object.
 The semanteme property helps to select the most appropriate semantic layer of an object.
 Decoration values of different objects can be compared to decide whether an object should be removed. Such can be decided by a decision engine, such as the one discussed in Chen et al., *An Adaptive Web Content Delivery System*, Proc. AH2000, Springer, 2000, pp. 284-If the decoration value is 0, then the object should be retained. Otherwise, the object can be removed if necessary.
 Rules for the hyperlink property include (1) an object should be retained if it has a hyperlink to another Object; and (2) an object should be retained if it has a hyperlink to an unsupported application.
 Rules for the interaction property include:
  Display: retain or substitute the object according to the actual situation.
  Submit/Query: the object should be retained, discarded or substituted with its brother objects as a whole according to the actual situation.
 Rules for the clustering property (for composite objects only):
  Complement: the composite object can be divided into several objects in different layers if they are separable. Such is diagrammatically represented in FIG. 12. This rule is reversible.
  Parallel: the composite object can be divided into several parts at its root children level, as shown in FIG. 13, if they are separable. This rule is reversible.
  Table: The composite object can be divided into several sub-tables along column (row) dimensions as shown in FIG. 14 (the original table is in the middle). Each sub-table contains the column (row) header and one or several rows (columns) of the table.

Web Adaptation over WAP Based on the Specific Function-Based Object Model

The rules described above are just basic guidelines and should not be construed as limiting in any sense. They can be combined with specific rules based on the specific function-based object model and application environment for content adaptation.

To assist the reader in further understanding and appreciating the adaptation process in the WAP context, and especially in view of exemplary specific rules based on a specific function-based object model, the following example is given.

The WAP environment is quite different from that of the web. Specifically, the WAP environment requires content re-authoring and truncation to enable WAP users to browse the web content on suitably configured devices. Additionally, the narrow bandwidth, small memory, different protocol and poor presentation capability (e.g. small screen size, poor support for multimedia, etc.) of WAP devices typically prohibit the delivery of normal web content and web pages originally designed for desktops. To address these problems, web content or web pages are divided into several "decks" for WAP devices. A deck is simply a sub-division of the web content or page at some level of granularity. These considerations make web content adaptation over WAP a significantly difficult problem to solve.

The following are some exemplary specific rules that can be used for WAP adaptation based on a specific function-based object model.

With respect to the navigation bar in index pages, since index pages mainly serve as navigation guides, the navigation bar should be retained. Text normal navigation bars can be retained without change. Image normal navigation bars, Frames, Menus or Maps should be converted into Text normal navigation bars. With respect to the navigation bar in content pages, since the purpose of a content page is to deliver semantic information, the navigation bar can be discarded. Otherwise, the small screens of WAP devices can be filled with redundant information.

Navigation lists can be retained. Normal List/Information and List/Introduction Lists can be retained without change. With respect to maps, such should be converted to a hyperlink text list.

Independent navigation lists can be retained.

User Query/User Submit should be retained as a whole, and the server side program can be revised to adapt to the WAP environment.

With respect to the decoration object, highlights can be replaced with big font text. Separators, list leaders, and background can all be discarded.

Special objects such as AD, Logo, Contact, Copyright, Reference, and the like, can be discarded or changed to a text form according to author's intention.

In addition to the specific adaptation rules described above, there are also language conversion rules (e.g. from HTML to WML). Four basic rules that can be used include:

- HTML Tags with similar syntax in WML are retained without change, e.g., <p>, <u>, <i>, <strong>, <em>, <big>, <small>,
- HTML Tags which can be replaced by one or several related WML Tags are converted into the corresponding WML Tags, e.g., <ul> ... </ul> to <p> ... </p>, ...
- HTML Tags which are invalid in WML are discarded, e.g., <embed>, <applet>, ...
- Complex HTML Tags are converted into a set of related WML Tags according to actual situation, e.g., <table>, In order to assist users in locating information quickly, the most important information should be delivered first. This can be achieved by reorganizing the web content into WML decks. A couple of exemplary decks are described in more detail below.

Exemplary Specific Architecture for WAP Adaptation

Figure 15:
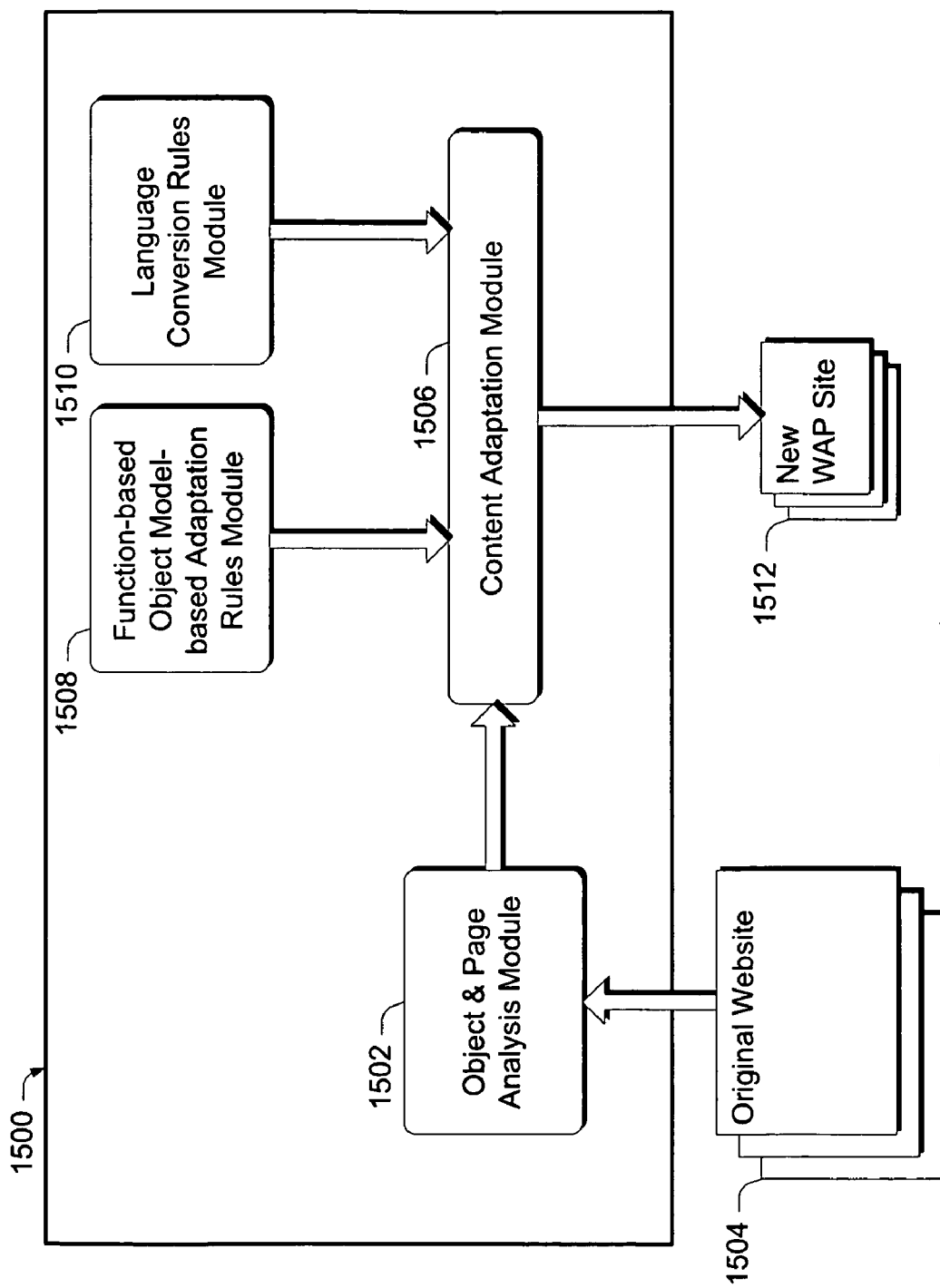
FIG. 15 is a block diagram of an exemplary computer architecture in accordance with one or more embodiments.

FIG. 15 illustrates an exemplary system architecture 1500 that can be utilized for WAP adaptation. Architecture 1500 is desirably implemented in software. An object & page analysis module 1502 generates a function-based object model for an original website 1504 using the techniques described above. A content adaptation module 1506 makes adaptations according to function-based object model-based adaptation rules 1508 and, where employed, language conversion rules 1510. Such produces web-adapted content in the form of a new WAP site 1512.

Adaptation Example

Figure 16:
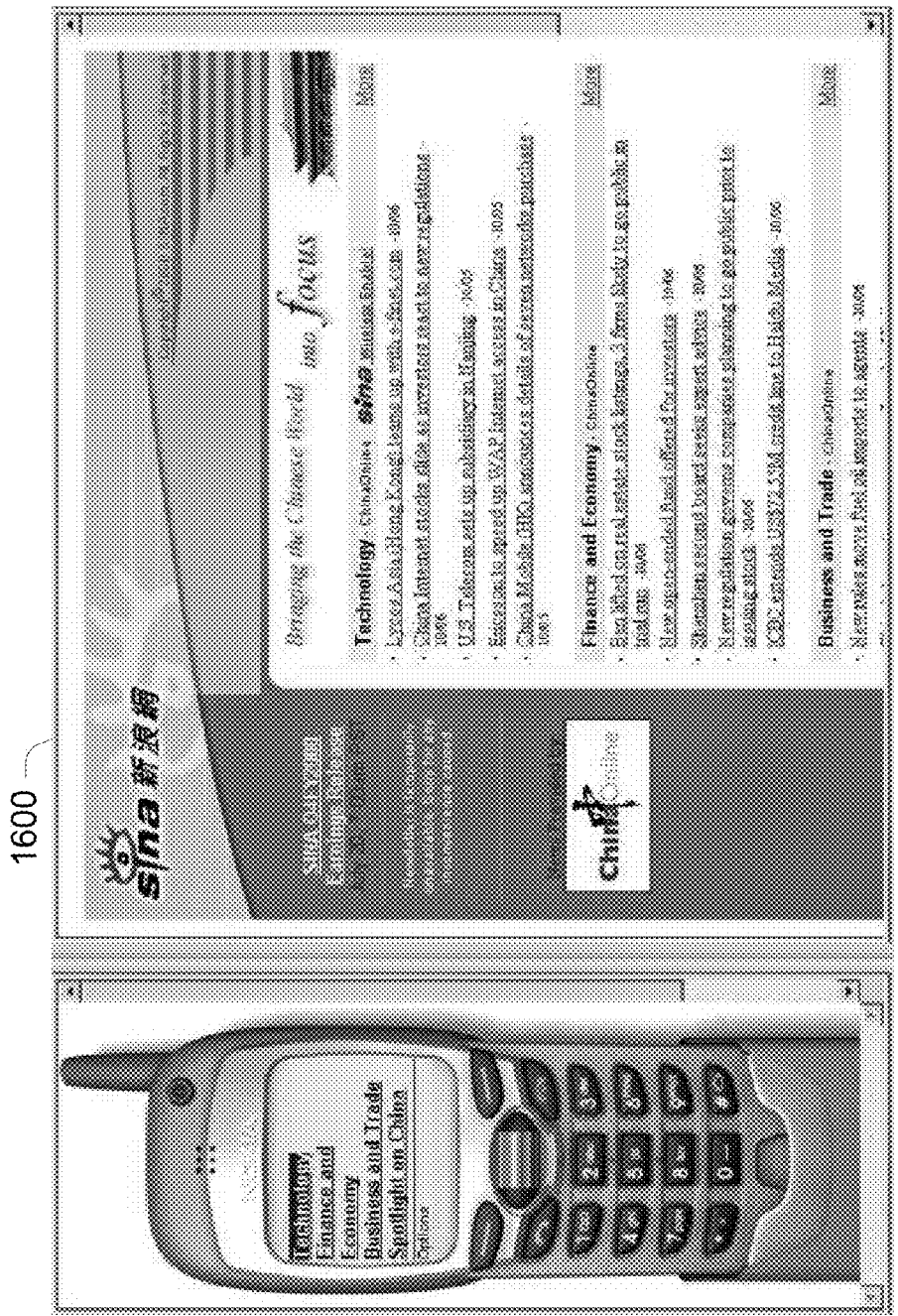
FIG. 16 is a diagram that diagrammatically illustrates web content in one format that has been converted to a different format, which, in this particular example, is in a format for presentation on a WAP-enabled device.
Figure 17:
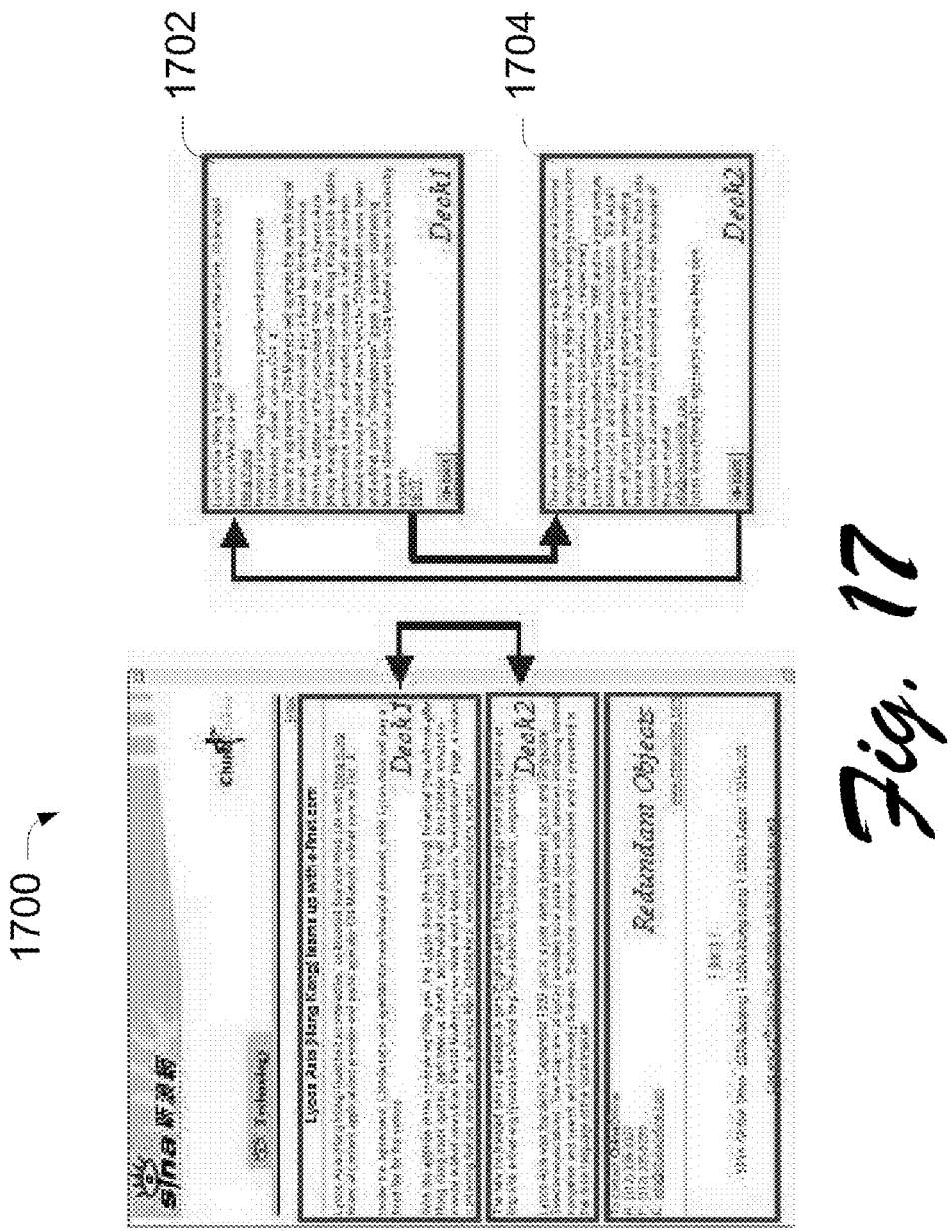
FIG. 17 is a diagram of an exemplary web page, and a diagrammatic representation of so-called decks that have been provided through an inventive adaptation process.

FIG. 10 shows an adaptation example for an Index Page 1000, in which content with unsupported media types are removed, and several new decks 1002-1014 are generated to show the original content at different layers. An index deck 1002 is an outline of the original page 1000. Detailed content resides in Deck 1-6 (i.e. decks 1004-1014). FIG. 16 shows the adaptation result in a WAP simulator FIG. 17 shows an adaptation result of a Content Page 1700, in which redundant content is removed, and the original page 1700 is divided into two decks 1702, 1704 because of the memory limitation of WAP devices.

Exemplary Computer Environment

The embodiments described above can be implemented in connection with any suitable computer environment. Aspects of the various embodiments can, for example, be implemented in connection with server computers, client computers/devices, or both server computers and client computers/devices. As but one example describing certain components of an exemplary computing system, consider FIG. 18.

Figure 18:
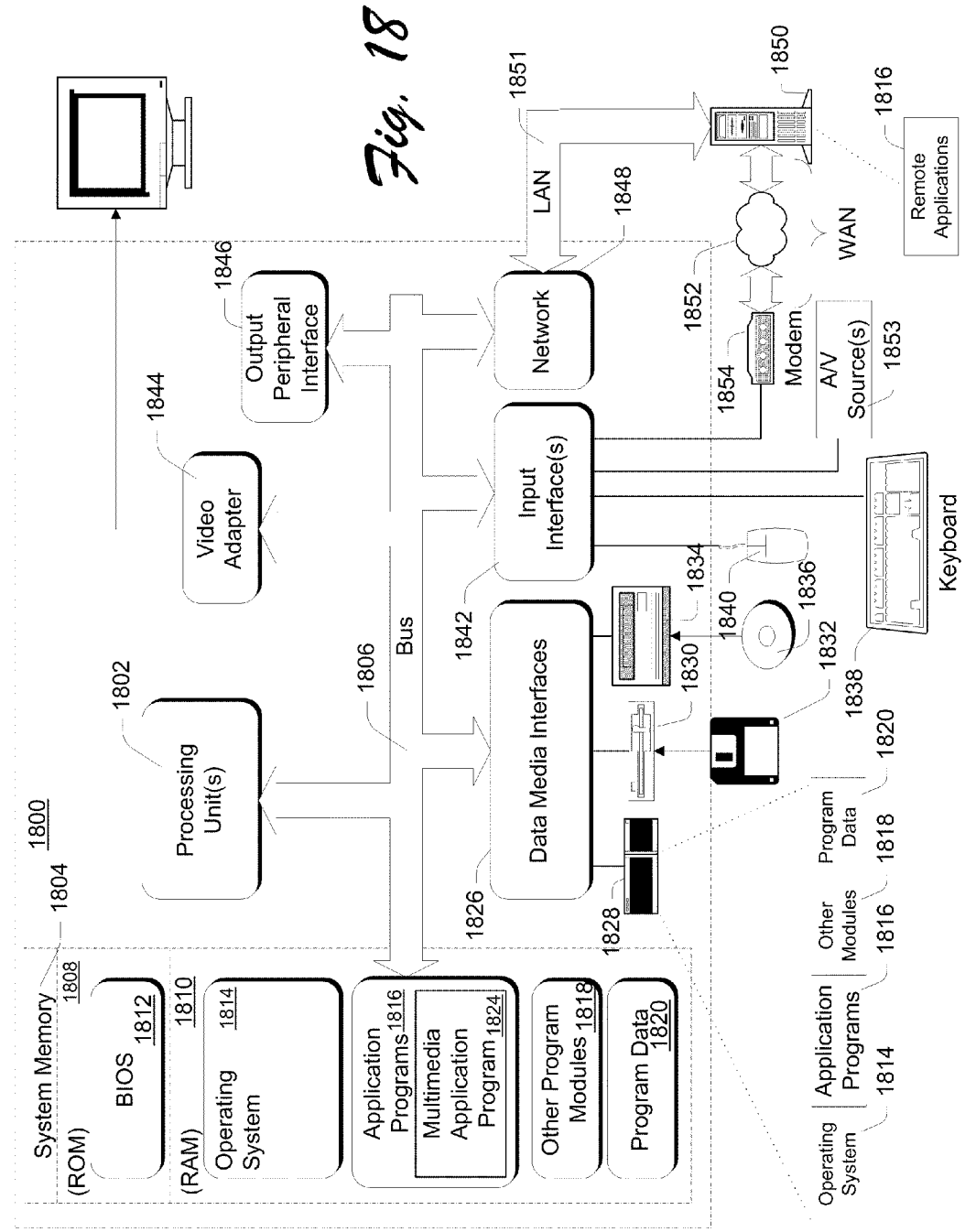
FIG. 18 is a block diagram of an exemplary computer environment in which various embodiments can be practiced.

FIG. 18 illustrates an example of a suitable computing environment 1800. It is to be appreciated that computing environment 1800 is only one example of a suitable computing environment and is not intended to suggest any limitation as to the scope of use or functionality of the inventive embodiments. Neither should the computing environment 1800 be interpreted as having any dependency or requirement relating to any one or combination of components illustrated in the exemplary computing environment 1800.

The inventive techniques can be operational with numerous other general purpose or special purpose computing system environments or configurations. Examples of well known computing systems, environments, and/or configurations that may be suitable for use with the inventive techniques include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

In certain implementations, the inventive techniques can be described in the general context of computer-executable instructions, such as program modules, being executed by a computer. Generally, program modules include routines, programs, objects, components, data structures, etc. that perform particular tasks or implement particular abstract data types. The inventive techniques may also be practiced in distributed computing environments where tasks are performed by remote processing devices that are linked through a communications network. In a distributed computing environment, program modules may be located in both local and remote computer storage media including memory storage devices.

In accordance with the illustrated example embodiment of FIG. 18 computing system 1800 is shown comprising one or more processors or processing units 1802, a system memory 1804, and a bus 1806 that couples various system components including the system memory 1804 to the processor Bus 1806 is intended to represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) buss also known as Mezzanine bus.

Computer 1800 typically includes a variety of computer readable media. Such media may be any available media that is locally and/or remotely accessible by computer 1800, and it includes both volatile and non-volatile media, removable and non-removable media.

In FIG. 18, the system memory 1804 includes computer readable media in the form of volatile, such as random access memory (RAM) 1810, and/or non-volatile memory, such as read only memory (ROM) 1808. A basic input/output system (BIOS) 1812, containing the basic routines that help to transfer information between elements within computer 1800, such as during start-up, is stored in ROM RAM 1810 typically contains data and/or program modules that are immediately accessible to and/or presently be operated on by processing unit(s)

Computer 1800 may further include other removable/non-removable, volatile/non-volatile computer storage media. By way of example only, FIG. 18 illustrates a hard disk drive 1828 for reading from and writing to a non-removable, non-volatile magnetic media (not shown and typically called a "hard drive"), a magnetic disk drive 1830 for reading from and writing to a removable, non-volatile magnetic disk 1832 (e.g., a "floppy disk"), and an optical disk drive 1834 for reading from or writing to a removable, non-volatile optical disk 1836 such as a CD-ROM, DVD-ROM or other optical media. The hard disk drive 1828, magnetic disk drive 1830, and optical disk drive 1834 are each connected to bus 1806 by one or more interfaces 1826.

The drives and their associated computer-readable media provide nonvolatile storage of computer readable instructions, data structures, program modules, and other data for computer 1800. Although the exemplary environment described herein employs a hard disk 1828, a removable magnetic disk 1832 and a removable optical disk 1836, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk 1828, magnetic disk 1832, optical disk 1836, ROM 1808, or RAM 1810, including, by way of example, and not limitation, an operating system 1814, one or more application programs 1816 (e.g., multimedia application program 1824), other program modules 1818, and program data 1820. Some of the application programs can be configured to present a user interface (UI) that is configured to allow a user to interact with the application program in some manner using some type of input device. This UI is typically a visual display that is capable of receiving user input and processing that user input in some way. Such a UI may, for example, comprises one or more buttons or controls that can be clicked on by a user.

Continuing with FIG. 18, a user may enter commands and information into computer 1800 through input devices such as keyboard 1838 and pointing device 1840 (such as a "mouse"). Other input devices may include a audio/video input device(s) 1853, a microphone, joystick, game pad, satellite dish, serial port, scanner, or the like (not shown). These and other input devices are connected to the processing unit(s) 1802 through input interface(s) 1842 that is coupled to bus 1806, but may be connected by other interface and bus structures, such as a parallel port, game port, or a universal serial bus (USB).

A monitor 1856 or other type of display device is also connected to bus 1806 via an interface, such as a video adapter 1844. In addition to the monitor, personal computers typically include other peripheral output devices (not shown), such as speakers and printers, which may be connected through output peripheral interface 1846.

Computer 1800 may operate in a networked environment using logical connections to one or more remote computers, such as a remote computer 1850. Remote computer 1850 may include many or all of the elements and features described herein relative to computer 1800.

As shown in FIG. 18, computing system 1800 can be communicatively coupled to remote devices (e.g., remote computer 1850) through a local area network (LAN) 1851 and a general wide area network (WAN) 1852. Such networking environments are commonplace in offices, enterprise-wide computer networks, intranets, and the Internet.

When used in a LAN networking environment, the computer 1800 is connected to LAN 1851 through a suitable network interface or adapter 1848. When used in a WAN networking environment, the computer 1800 typically includes a modem 1854 or other means for establishing communications over the WAN 1852. The modem 1854, which may be internal or external, may be connected to the system bus 1806 via the user input interface 1842, or other appropriate mechanism.

In a networked environment, program modules depicted relative to the personal computer 1800, or portions thereof, may be stored in a remote memory storage device. By way of example, and not limitation, FIG. 18 illustrates remote application programs 1816 as residing on a memory device of remote computer It will be appreciated that the network connections shown and described are exemplary and other means of establishing a communications link between the computers may be used.

CONCLUSION

Compared to other approaches, the inventive approach described above has more satisfactory results and brings the same consistent browsing experience to users. Since an author's intention is well understood through the function-based object model analysis, the content adaptation is quite reasonable. For example, page function analysis (index/content page) has helped the decision making process, in WAP and other scenarios, as to whether to keep a navigation bar or not. Since the major purpose of an index page is to provide a navigation guide to users, the navigation bar is retained in the index page. On the contrary, the major purpose of the content page is to provide information to users, and, hence, the navigation bar can be considered as redundant information, and is therefore removed.

Another example is the generation of an index deck, as in FIG. 10. The system first detects the navigation lists in the index page through function-based object model analysis. At the same time, the parallel clustering relationship of these navigation lists is also detected. The system then extracts the abstract information from these navigation lists, and lists them as "peers" to generate the new index deck, which, in turn, enables users to navigate the adapted content easily.

The described methods and systems are advantageously adaptable to different various websites because of the general nature of the approach. That is, the described embodiments can be based on visual information and functional property analysis instead of tag analysis. As a result, the methods are not only able to handle HTML based websites, but can also be easily extended to other web environment such as DHTML based websites (as set forth in the W3C).

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A web content adaptation method comprising:
   under control of one or more processors configured with executable instructions,
   receiving multiple web pages configured for display on a first device type;
   analyzing one or more functions associated with a webpage from among the multiple web pages received;
   detecting multiple different objects that comprise the multiple web pages;
   classifying composite objects, from among the multiple different objects detected, the classifying of each composite object based on a number of component objects it contains;
   applying one or more rules to basic objects from among the multiple different objects detected, each basic object comprising a single component object, the rules applied to ascertain a category of each basic object, the rules comprising:
      distinguishing basic objects with and without hyperlinks;
      distinguishing, among basic objects with hyperlinks, basic objects with links to another object and basic objects with links to another application;
      distinguishing, among basic objects with hyperlinks, basic objects that are a root child of a composite object and basic objects that are not a root child of a composite object; and
      distinguishing basic objects without hyperlinks, including information objects and special control objects; and
   displaying the multiple web pages on a second device type that is different from the first device type, the displaying performed according to the receiving, the analyzing, the detecting, the classifying and the applying.

2. The method of claim 1, wherein said analyzing comprises generating one or more function-based object models that represent objects comprising the webpage.

3. The method of claim 2, wherein said generating comprises:
   identifying one or more basic objects associated with the webpage, basic objects comprising a smallest information body that cannot be further divided; and
   identifying one or more composite objects associated with the webpage, composite objects comprising objects that contain other objects.

4. The method of claim 1, wherein said displaying comprises doing so in view of one or more networking conditions.

5. The method of claim 1, wherein said displaying comprises doing so in view of one or more user preferences.

6. A web content adaptation method comprising:
   under control of one or more processors configured with executable instructions,
   receiving multiple web pages;
   analyzing one or more functions associated with a webpage from among the multiple web pages received, the webpage configured for presentation within a first client environment;
   detecting multiple different objects that comprise the multiple web pages;
   classifying composite objects, from among the multiple different objects detected, the classifying of each composite object based on a number of component objects it contains;
   applying one or more rules to basic objects from among the multiple different objects detected, each basic object comprising a single component object, the rules applied to ascertain a category of each basic object, the rules comprising:
      distinguishing basic objects with and without hyperlinks;
      distinguishing, among basic objects with hyperlinks, basic objects with links to another object and basic objects with links to another application;
      distinguishing, among basic objects with hyperlinks, basic objects that are a root child of a composite object and basic objects that are not a root child of a composite object; and
      distinguishing basic objects without hyperlinks, including information objects and special control objects; and
   based on said analyzing, detecting, classifying and applying, adapting the webpage for presentation within a second client environment that is different from the first client environment.

7. The method of claim 6, wherein said analyzing comprises generating one or more function-based object models that represent objects comprising the webpage.

8. The method of claim 7, wherein said generating comprises:
   identifying one or more basic objects associated with the webpage, basic objects comprising a smallest information body that cannot be further divided; and
   identifying one or more composite objects associated with the webpage, composite objects comprising objects that contain other objects.

9. The method of claim 8, wherein said generating further comprises generating said one or more function-based object models as a function of properties that are associated with said one or more basic objects and said one or more composite objects.

10. The method of claim 9, wherein said adapting comprises applying one or more rules to said one or more function-based object models.

11. The method of claim 6, wherein said first and second client environments pertain to different client devices.

12. The method of claim 6, wherein said first and second client environments pertain to different types of client devices.

13. The method of claim 6, wherein said first and second client environments pertain to different network conditions.

14. The method of claim 6, wherein said first and second client environments pertain to different user preferences.

15. One or more computer-readable media having computer-readable instructions thereon which, when executed by the one or more processors, cause the one or more processors to implement the method of claim 6.

16. A web content adaptation method comprising:
   under control of one or more processors configured with executable instructions, adapting web content from one format to another, by operation of multiple function-based object models, where the function-based object models comprise models that pertain to:
  basic objects that comprise a smallest information body that cannot be further divided, and
  composite objects that comprise objects that can contain other objects;
receiving multiple web pages configured for display on a first device type;
analyzing one or more functions associated with a webpage from among the multiple web pages received;
detecting multiple different objects that comprise the multiple web pages;
classifying composite objects, from among the multiple different objects detected, the classifying of each composite object based on a number of component objects it contains;
applying one or more rules to basic objects from among the multiple different objects detected, each basic object comprising a single component object, the rules applied to ascertain a category of each basic object, the rules comprising:
  distinguishing basic objects with and without hyperlinks;
  distinguishing, among basic objects with hyperlinks, basic objects with links to another object and basic objects with links to another application;
  distinguishing, among basic objects with hyperlinks, basic objects that are a root child of a composite object and basic objects that are not a root child of a composite object; and
  distinguishing basic objects without hyperlinks, including information objects and special control objects; and
displaying the multiple web pages on a second device type that is different from the first device type, the displaying performed according to the adapting, the receiving, the analyzing, the detecting, the classifying and the applying.

17. The web content adaptation method of claim 16, wherein the function-based object models are generated as a function of one or more properties associated with the objects.

18. A system for adapting web content from one format to another comprising:
  a processor;
  a memory, in communication with the processor, the memory comprising processor-executable statements configured to define:
  one or more function-based object models, individual function-based object models representing objects that are present in a webpage in terms of one or more of an object's functional properties;
  a content adaptation module configured for:
    receiving multiple web pages configured for display on a first device type;
    analyzing one or more functions associated with a webpage from among the multiple web pages received;
    detecting multiple different objects that comprise the multiple web pages;
    classifying composite objects, from among the multiple different objects detected, the classifying performed according to a number of component objects in each;
  a function-based object model for applying one or more rules to basic objects from among the multiple different objects detected, each basic object comprising a single component object, the rules applied to ascertain a category of each basic object, the rules comprising:
    distinguishing basic objects with and without hyperlinks;
    distinguishing, among basic objects with hyperlinks, basic objects with links to another object and basic objects with links to another application;
    distinguishing, among basic objects with hyperlinks, basic objects that are a root child of a composite object and basic objects that are not a root child of a composite object; and
    distinguishing basic objects without hyperlinks, including information objects and special control objects; and
  the content adaptation module further configured for displaying the multiple web pages on a second device type that is different from the first device type, the displaying performed according to the content adaptation module and the function-based object model.

19. The system of claim 18, wherein one of the properties comprises a presentation property that defines a way in which the object is presented.

20. The system of claim 18, wherein one of the properties comprises a semanteme property associated with the content of an object.

21. The system of claim 18, wherein one of the properties comprises a decoration property pertaining to the extent to which an object serves to decorate a webpage.

22. The system of claim 18, wherein one of the properties comprises a hyperlink property pertaining to an object to which another object points via a hyperlink.

23. The system of claim 18, wherein one of the properties comprises a interaction property pertaining to an interaction method of an object.

24. The system of claim 18, wherein one of the properties comprises a clustering relationship property pertaining to a relationship among any root children of an object.

25. The system of claim 18, wherein one of the properties comprises a presentation relationship property pertaining to a presentation order associated with any root children of an object.

26. A computer architecture for use in adapting web content for display on a computing device, the architecture comprising:
  a processor;
  a memory, in communication with the processor, the memory comprising processor-executable statements configured to define:
    an analysis module for receiving at least one webpage and processing the one webpage to produce one or more function-based object models that describe functional properties of objects that are contained in the one webpage;
    one or more rules modules that contain rules that are to be used to adapt content contained in the webpage, the rules comprising:
      distinguishing basic objects with and without hyperlinks;
      distinguishing, among basic objects with hyperlinks, basic objects with links to another object and basic objects with links to another application;
      distinguishing, among basic objects with hyperlinks, basic objects that are a root child of a composite object and basic objects that are not a root child of a composite object; and distinguishing basic objects without hyperlinks, including information objects and special control objects; and a content adaptation module configured to process the one or more function-based object models in accordance with one or more rules contained in the one or more rules modules to produce a new web page that has been adapted from the one web page.

27. The computer architecture of claim 26, wherein the content adaptation module is configured to produce a new web page for display on a WAP-enabled device.

28. The computer architecture of claim 26, wherein said analysis module is configured to produce function-based object models that pertain to both basic objects and composite objects, basic objects comprising a smallest information body that cannot be further divided; and composite objects comprising objects that contain other objects.

29. The computer architecture of claim 28, wherein said analysis module is configured to produce, for basic objects, function-based object models that comprise values associated with the following properties: (1) a presentation property that defines a way in which the object is presented, (2) a semanteme property associated with content of an object, (3) a decoration property pertaining to an extent to which the basic objects serves to decorate the webpage, (4) a hyperlink property pertaining to an object to which the basic object points via a hyperlink, and (5) a interaction property pertaining to an interaction method of the basic object.

30. The computer architecture of claim 28, wherein said analysis module is configured to produce, for composite objects, function-based object models that comprise values associated with the following properties: (1) a clustering relationship property pertaining to a relationship among root children of the composite object, and (2) a presentation relationship property pertaining to a presentation order associated with the root children of the composite object.

* * * * *